United States Patent
Yang et al.

(10) Patent No.: US 9,244,715 B2
(45) Date of Patent: Jan. 26, 2016

(54) VIRTUALIZATION PROCESSING METHOD AND APPARATUSES, AND COMPUTER SYSTEM

(71) Applicant: Huawei Technologies Co., Ltd., Shenzhen, Guangdong (CN)

(72) Inventors: Xiaowei Yang, Hangzhou (CN); Feng Wang, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 14/029,276

(22) Filed: Sep. 17, 2013

(65) Prior Publication Data

US 2014/0019973 A1    Jan. 16, 2014

Related U.S. Application Data

(63) Continuation of application No. 13/675,120, filed on Nov. 13, 2012, now Pat. No. 8,635,616, which is a continuation of application No. PCT/CN2012/075846, filed on May 22, 2012.

(30) Foreign Application Priority Data

Dec. 31, 2011    (CN) .......................... 2011 1 0458345

(51) Int. Cl.
G06F 9/455    (2006.01)
G06F 3/00     (2006.01)

(52) U.S. Cl.
CPC ........ *G06F 9/45545* (2013.01); *G06F 9/45558* (2013.01); *G06F 3/002* (2013.01); *G06F 2009/45579* (2013.01)

(58) Field of Classification Search
CPC .................................................... G06F 3/0002
See application file for complete search history.

(56) References Cited

U.S. PATENT DOCUMENTS 6,195,345 B1    2/2001  Kramer
6,981,042 B1   12/2005  Rey
(Continued)

FOREIGN PATENT DOCUMENTS

CN    101976200 A    2/2001
CN    101093449 A   12/2007
(Continued)

OTHER PUBLICATIONS

Rixner, Scott, "Network Virtualization: Breaking the Performance Barrier," Queue, vol. 6 Issue 1, pp. 36-43; 52, Association for Computing Machinery, New York, New York (Jan./Feb. 2008).

(Continued)

*Primary Examiner* — Camquy Truong
(74) *Attorney, Agent, or Firm* — Leydig, Voit & Mayer, Ltd.

(57) ABSTRACT

A virtualization processing method and apparatuses, and a computer system are provided. Where a computing node includes: a hardware layer, a Host running on the hardware layer, and at least one virtual machine (VM) running on the Host, the hardware layer includes an I/O device, several corresponding virtual function (VF) devices are virtualized from the I/O device, the Host has several VF software instances, the several VF software instances and the several VF devices are in one-to-one correspondence; the Host further has a back-end instance (BE) of an I/O virtual device having the same type with the I/O device, the VM has a front-end instance (FE) of the I/O virtual device; the BE in the Host is bound with an idle VF software instance. The solutions of the embodiments of the present invention are beneficial to optimization of the performance and compatibility of a virtualization system.

12 Claims, 16 Drawing Sheets

(56) References Cited

U.S. PATENT DOCUMENTS

| | | | |
|---|---|---|---|
| 8,178,754 | B1 | 5/2012 | Kyle et al. |
| 2006/0294517 | A1 | 12/2006 | Zimmer et al. |
| 2007/0271560 | A1 | 11/2007 | Wahlert et al. |
| 2007/0276897 | A1* | 11/2007 | Tameshige et al. ............ 709/201 |
| 2008/0140866 | A1* | 6/2008 | Corry et al. ........................ 710/8 |
| 2009/0037941 | A1 | 2/2009 | Armstrong et al. |
| 2010/0077397 | A1 | 3/2010 | Ooi et al. |
| 2011/0179418 | A1 | 7/2011 | Takebe et al. |

FOREIGN PATENT DOCUMENTS

| | | |
|---|---|---|
| CN | 102016800 A | 4/2011 |
| EP | 0944257 A1 | 9/1999 |
| JP | 2006294517 A | 10/2006 |
| JP | 2011145912 A | 7/2011 |
| RU | 2259020 C2 | 8/2005 |
| RU | 2433459 C2 | 11/2011 |
| WO | 2011002575 A1 | 1/2011 |
| WO | WO 2011075870 A1 | 6/2011 |

OTHER PUBLICATIONS $1^{st}$ Office Action in related U.S. Appl. No. 13/675,120 (Apr. 12, 2013).

$2^{nd}$ Office Action in related U.S. Appl. No. 13/675,120 (Jul. 5, 2013).

International Search Report in corresponding International Patent Application No. PCT/CN2012/075846 (Jul. 5, 2012).

Partial Translation of the International Search Report and Written Opinion of the International Searching Authority in corresponding International Patent Application No. PCT/CN2012/075846 (Jul. 5, 2012).

Li et al., "IO Virtualization Technology Based on SR-IOV," Computer and Information Technology, vol. 18, No. 5 (Oct. 2010).

Accompanying letter to Notice of Allowance in corresponding Russian Patent Application No. 2014117656/08(028063) (Oct. 8, 2015).

* cited by examiner

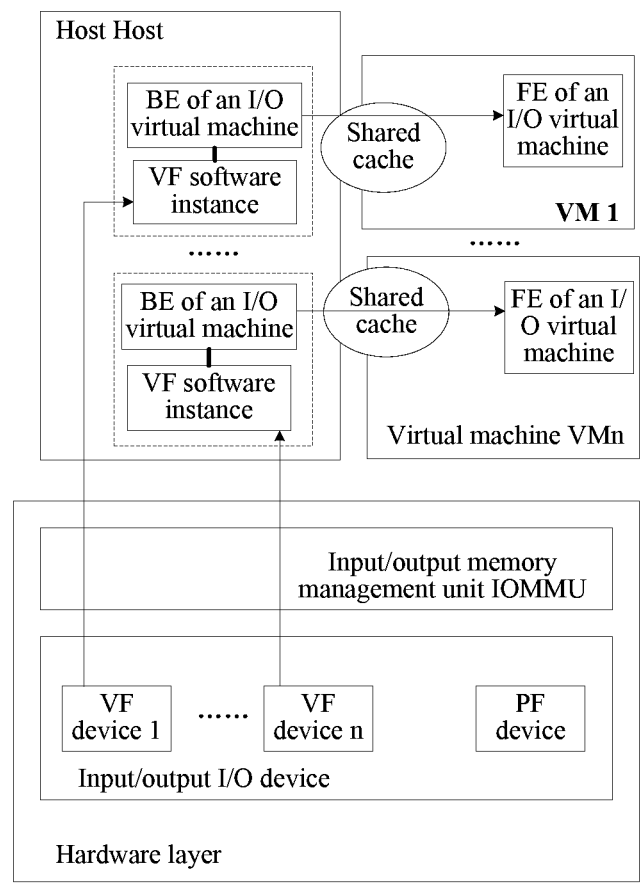
FIG. 2-a

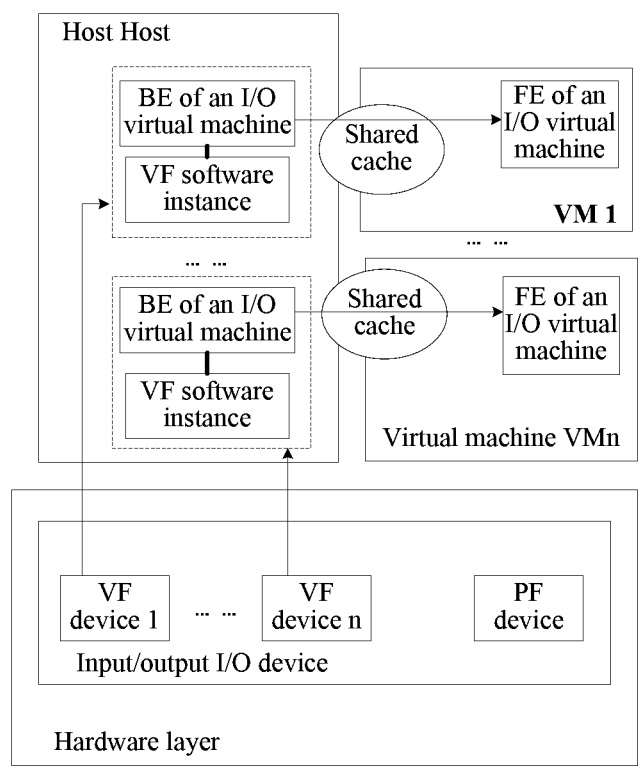
FIG. 2-b

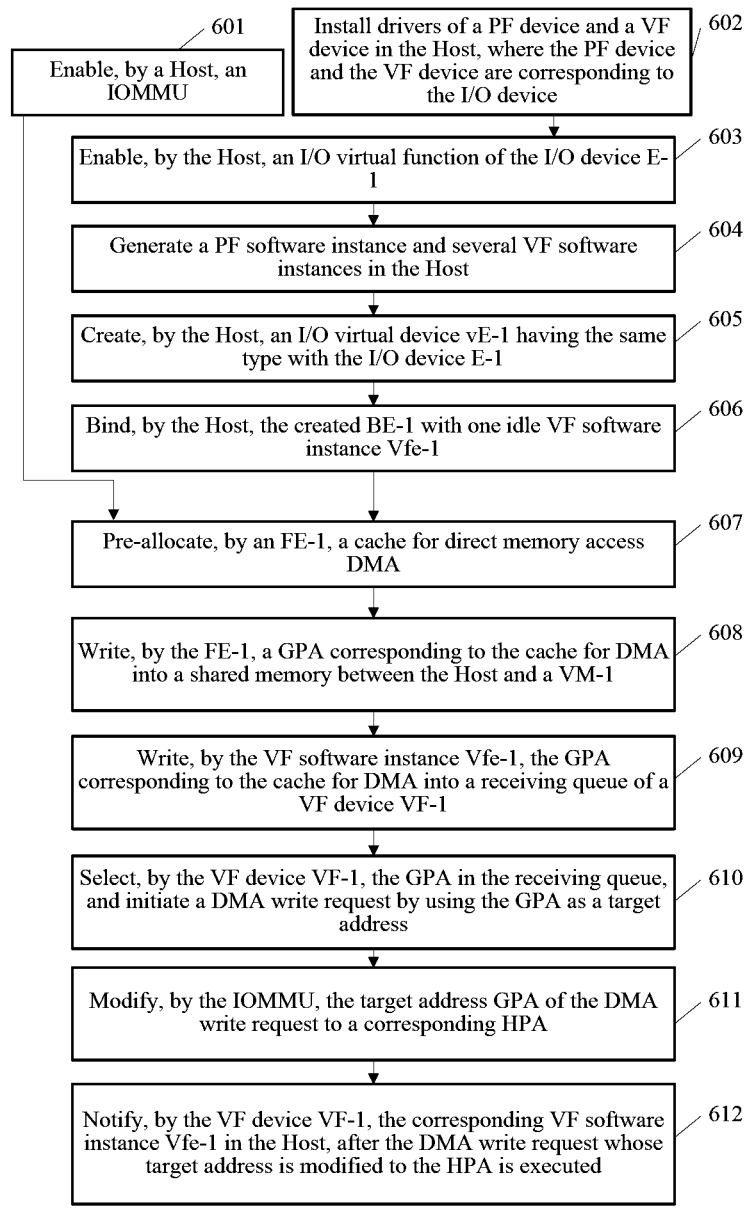
FIG. 6-a

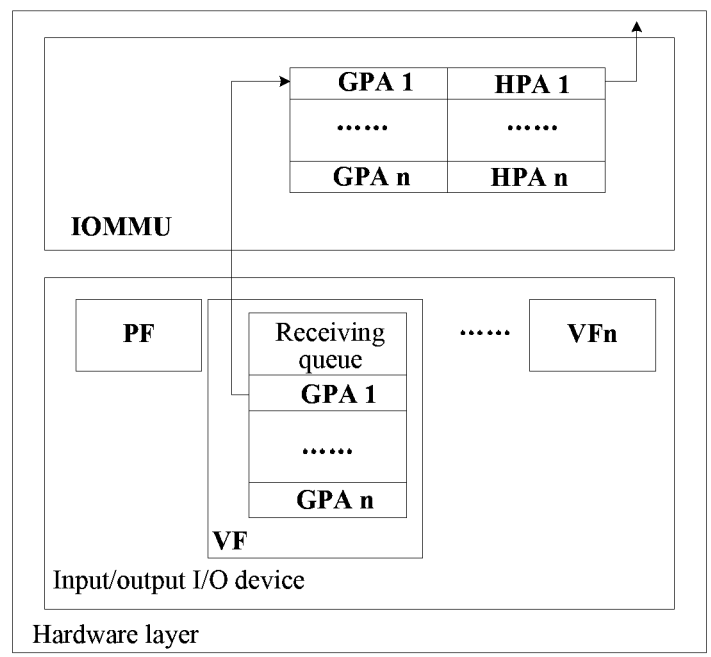
FIG. 6-b

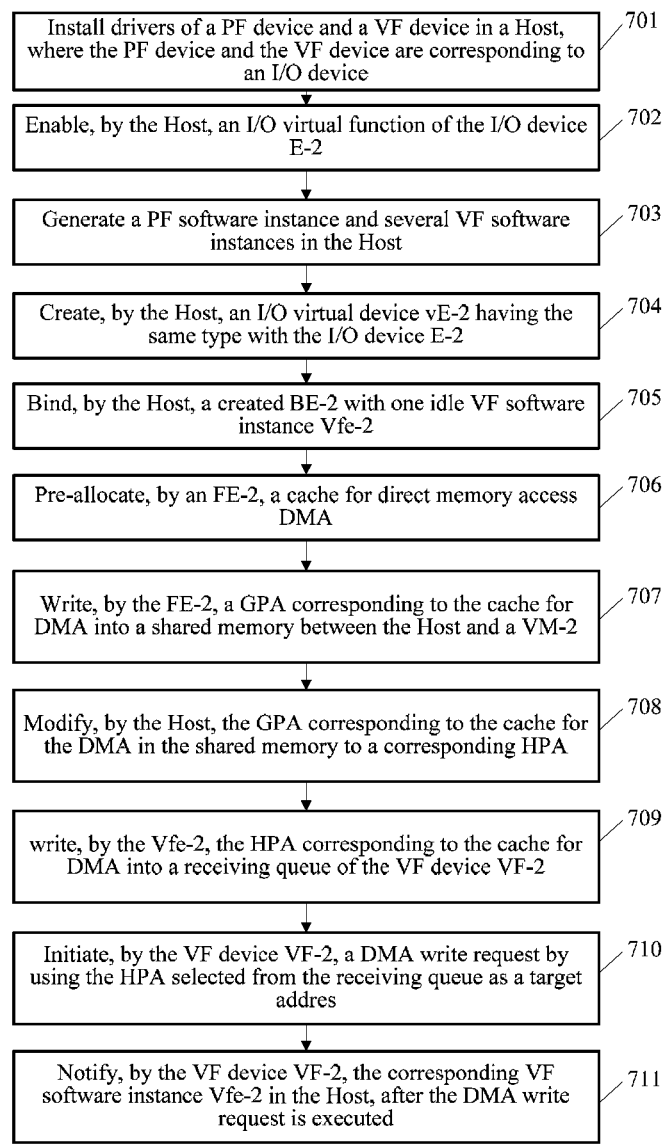
FIG. 7-a

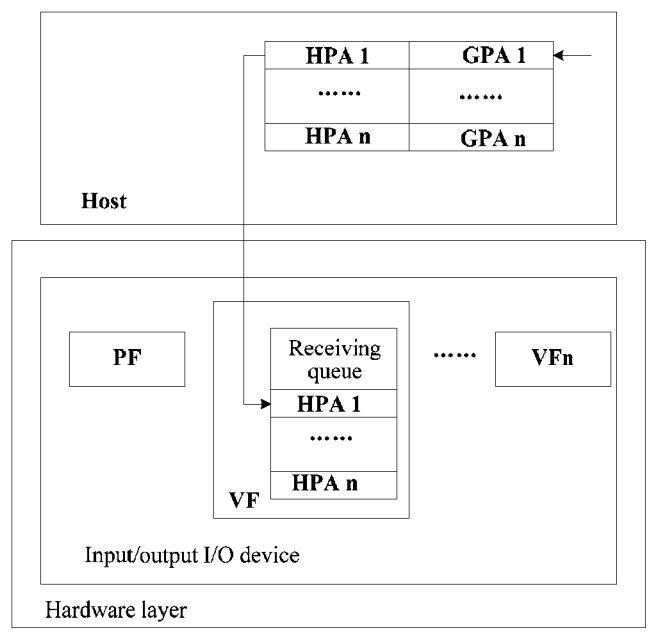
FIG. 7-b

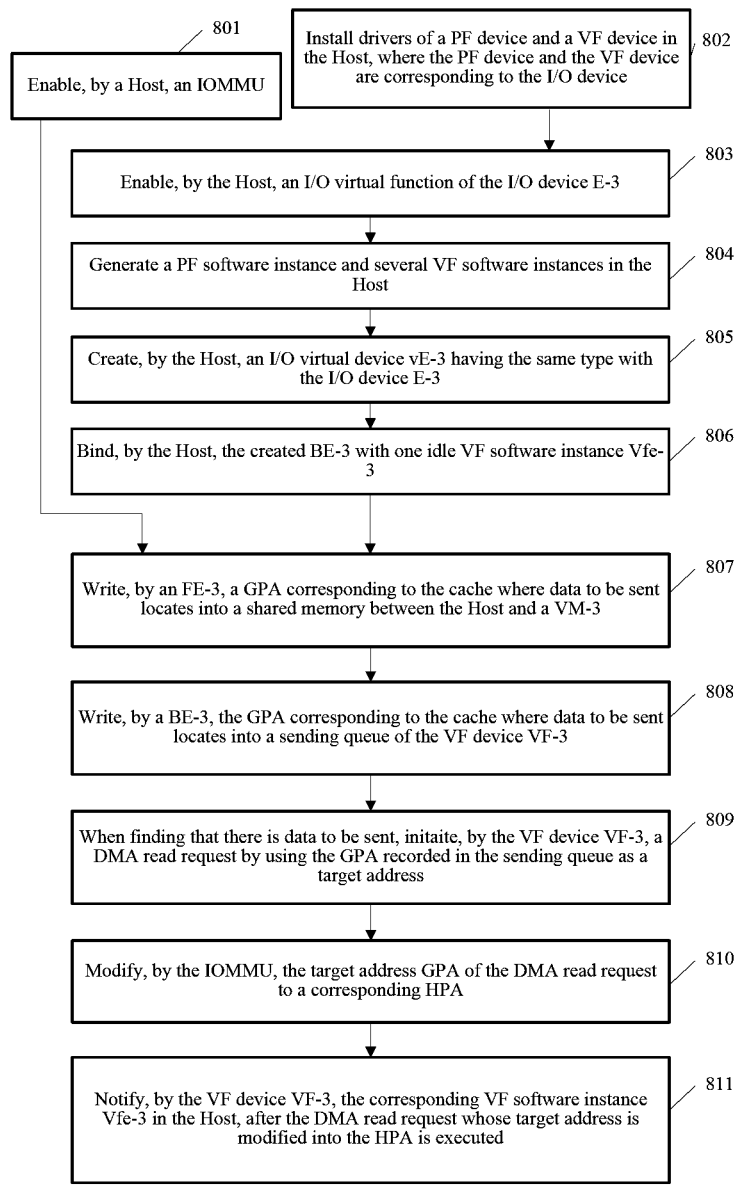
FIG. 8-a

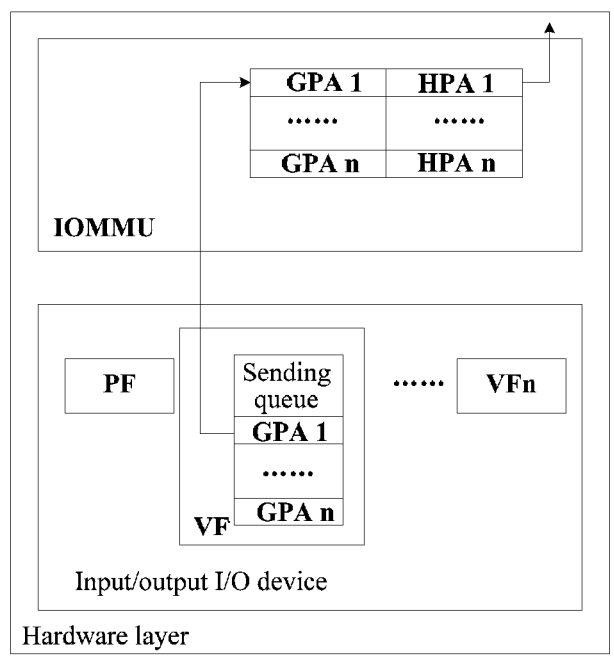
FIG. 8-b

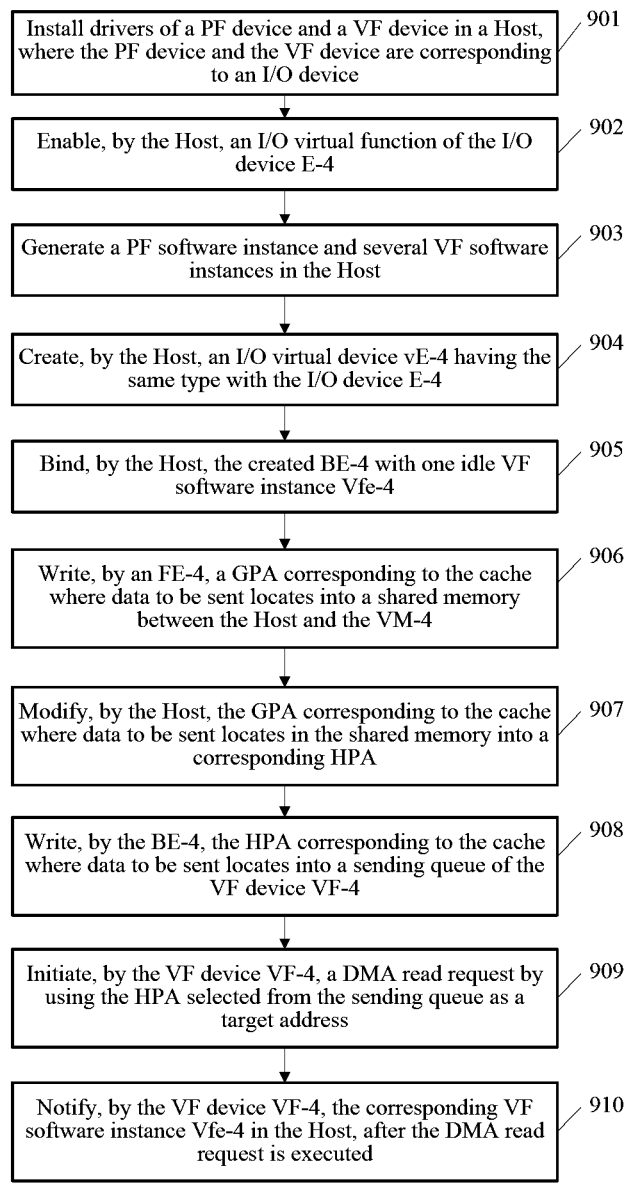
FIG. 9-a

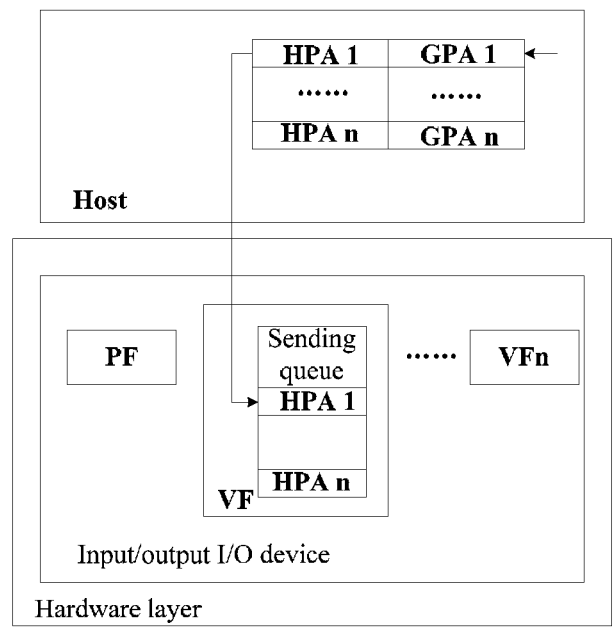
FIG. 9-b
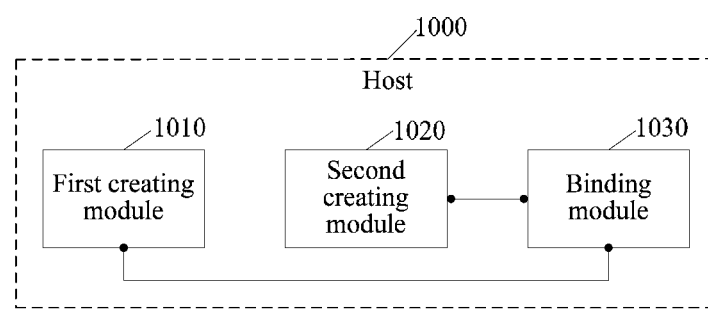
FIG. 10

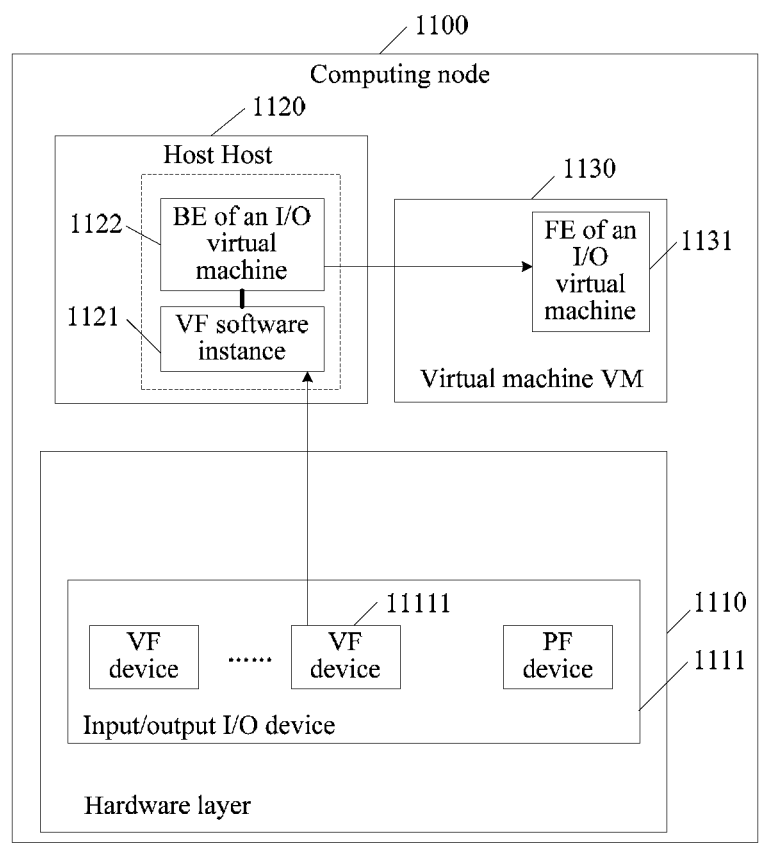
FIG. 11-a

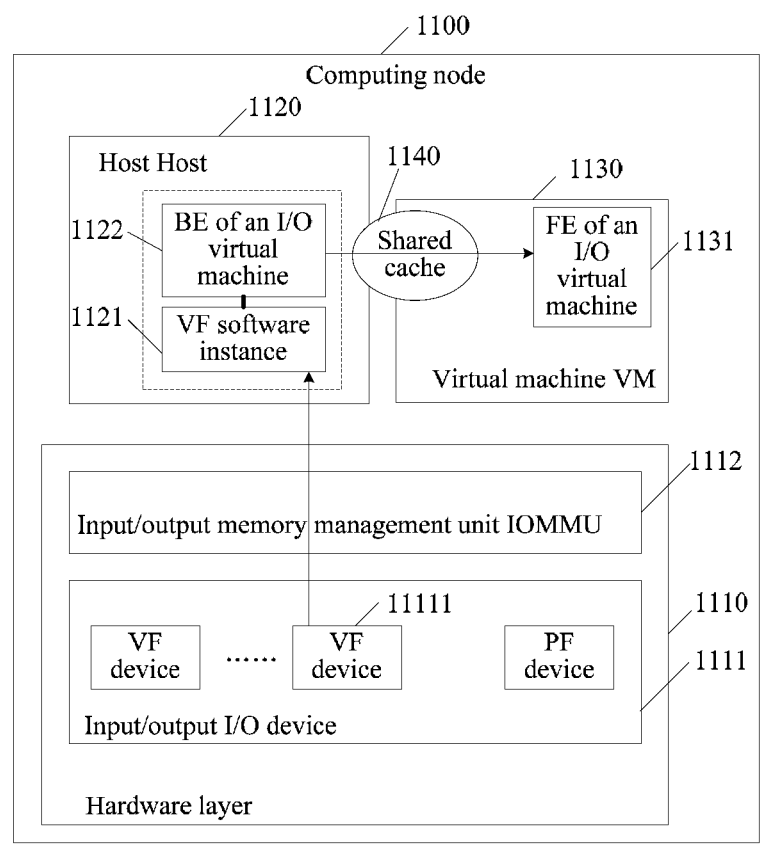
FIG. 11-b

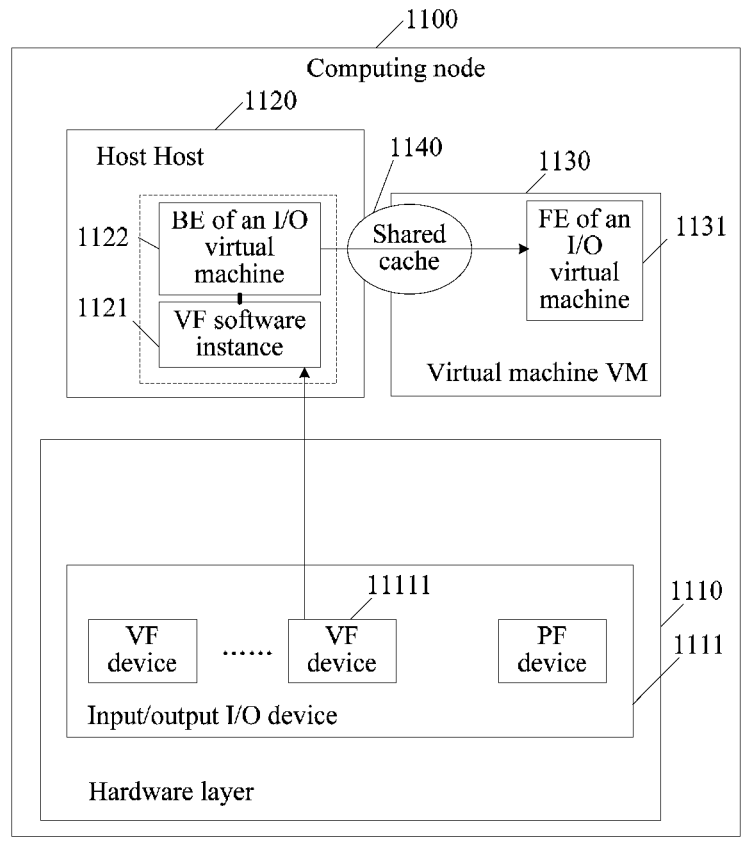
FIG. 11-c
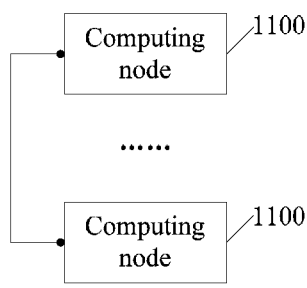
FIG. 12

VIRTUALIZATION PROCESSING METHOD AND APPARATUSES, AND COMPUTER SYSTEM

CROSS-REFERENCE TO RELATED APPLICATIONS

This application is a continuation of U.S. patent application Ser. No. 13/675,120, filed on Nov. 13, 2012, which is a continuation of International Patent Application No. PCT/CN2012/075846, filed on May 22, 2012. The International Patent Application claims priority to Chinese Patent Application No. 201110458345.8, filed on Dec. 31, 2011. The aforementioned patent applications are hereby incorporated by reference in their entireties.

FIELD OF THE INVENTION

The present invention relates to the field of computer technologies, and in particular, to a virtualization processing method and apparatuses, and a computer system.

BACKGROUND OF THE INVENTION

Virtualization technology is a decoupling technology for separating a bottom hardware device from an upper operating system and application programs, and referring to FIG. 1, a virtual machine monitor (VMM, Virtual Machine Monitor) layer is introduced to directly manage bottom hardware resources, create a virtual machine (VM, Virtual Machine) irrelevant to the bottom hardware for being used by the upper operating system and application programs.

The virtualization technology, as one of the important supporting technologies of the currently popular cloud computing (Cloud Computing) platform, can greatly improve the resource utilization efficiency of a physical device. Compared with a conventional physical server, the virtual machine has better isolation and encapsulation, and information of the whole virtual machine can be saved in a virtual disk image (VDI, Virtual Disk Image), so as to conveniently perform operations such as snapshot, backup, cloning and delivering for the virtual machine.

With the evolution of the x86 processor, the virtualization technology of a central processing unit (CPU, Central Processing Unit) and a memory is increasingly perfected, with ever-decreasing overhead. Based on the latest processor, the overhead of virtualization of CPU and memory for most applications has been less than 10%. In an input/output (I/O, Input/Output) virtualization field, the virtualization I/O solution having high performance and low delay is still a key technical challenge in the virtualization field. The conventional I/O virtualization solution includes two types, namely, a software solution and a hardware solution. However, the conventional software solution and hardware solution both have their outstanding advantages and disadvantages. For example, the conventional software solution is advantageous in compatibility, but has great performance loss; the hardware solution can bring about desired performance, but has problems such as feature compatibility and guest operating system (Guest OS) compatibility.

SUMMARY OF THE INVENTION

Embodiments of the present invention provide a virtualization processing method and apparatuses, and a computer system, so as to optimize performance and compatibility of a virtualization system.

In order to solve the foregoing technical problems, the embodiments of the present invention provide the following technical solutions.

In one aspect, an embodiment of the present invention provides a virtualization processing method, which is applied to a computing node, and the computing node includes:

a hardware layer, a Host running on the hardware layer, and at least one virtual machine VM running on the Host, where the hardware layer includes an input/output I/O device, several corresponding virtual function VF devices are virtualized from the I/O device, the Host has several VF software instances, the several VF software instances and the several VF devices are in one-to-one correspondence; the Host further has a back-end instance BE of an I/O virtual device having the same type with the I/O device, the VM has a front-end instance FE of the I/O virtual device; the BE in the Host is bound with an idle VF software instance;

the method includes:

pre-allocating, by the FE, a cache for direct memory access (DMA);

acquiring, by the VF software instance bound with the BE, an address corresponding to the cache for DMA through an exporting application programming interface of the BE, writing the acquired address corresponding to the cache for DMA into a first storage unit of a VF device corresponding to the VF software instance; selecting, by the VF device, an address corresponding to the cache for DMA from the first storage unit when there is data to be received, and initiating a DMA write request by using the selected address corresponding to the cache for DMA as a target address; notifying, by the VF device, the VF software instance which is corresponding to the VF device and is in the Host after the DMA write request is executed, so that the VF software instance triggers the FE to receive data written into the cache corresponding to the address.

In another aspect, an embodiment of the present invention further provides a virtualization processing method, including:

after an I/O virtual function of an input/output I/O device is enabled, generating several VF software instances in a Host; where several corresponding virtual function VF devices are virtualized from the I/O device with the I/O virtual function enabled; the several VF software instances and the several VF devices are in one-to-one correspondence;

creating, by the Host, an I/O virtual device having the same type with the I/O device, where a back-end instance BE of the I/O virtual device is created in the Host, a front-end instance FE of the I/O virtual device is created in the initiated virtual machine VM; and binding the BE with an idle VF software instance.

In another aspect, an embodiment of the present invention further provides a computing node, including: a hardware layer, a Host running on the hardware layer, and at least one virtual machine VM running on the Host, where the hardware layer includes an input/output I/O device, several corresponding virtual function VF devices are virtualized from the I/O device, the Host has several VF software instances, the several VF software instances and the several VF devices are in one-to-one correspondence; the Host further has a back-end instance BE of an I/O virtual device having the same type with the I/O device, the VM has a front-end instance FE of the I/O virtual device; the BE in the Host is bound with an idle VF software instance;

where, the FE is configured to pre-allocate a cache for direct memory access (DMA);

the VF software instance bound with the BE is configured to acquire an address corresponding to the cache for DMA through an exporting application programming interface of the BE, write the acquired address corresponding to the cache for DMA into a first storage unit in a VF device corresponding to the VF software instance;

the VF device is configured to select the address corresponding to the cache for DMA from the first storage unit when there is data to be received, and initiate a DMA write request by using the selected address corresponding to the cache for DMA as a target address; and notify the VF software instance which is corresponding to the VF device and is in the Host after the DMA write request is executed, so that the VF software instance triggers the FE to receive data written into the cache corresponding to the address.

In another aspect, an embodiment of the present invention further provides a host, including:

a first creating module, configured to, after an I/O virtual function of an input/output I/O device is enabled, generate several VF software instances in the Host; where several corresponding virtual function VF devices are virtualized from the I/O device with the I/O virtual function enabled; the several VF software instances and the several VF devices are in one-to-one correspondence;

a second creating module, configured to create an I/O virtual device having the same type with the I/O device, where a back-end instance BE of the I/O virtual device is created in the Host, a front-end instance FE of the I/O virtual device is created in the initiated virtual machine VM; and a binding module, configured to bind the BE created by the second creating module with an idle VF software instance created by the first creating module.

It can be seen that, the computing node in the embodiments of the present invention may include: a hardware layer, a Host running on the hardware layer, and at least one VM running on the Host, the hardware layer includes an input/output I/O device, several corresponding virtual function VF devices are virtualized from the I/O device, the Host has several VF software instances, the several VF software instances and the several VF devices are in one-to-one correspondence; the Host further has a back-end instance BE of an I/O virtual device having the same type with the I/O device, the VM has a front-end instance FE of the I/O virtual device; where the BE in the Host is bound with an idle VF software instance. In this way, application architecture in which each VM can independently use one VF device is established, a channel between one VF device virtualized from the I/O device and the front-end instance FE in one VM is got through, so that the FE can access the VF device through the BE in the Host. The VF device virtualized from the I/O device is separately allocated to the VM for use, and the VF device can provide a high-efficiency device interface, so it is beneficial for the VM to acquire the performance similar to that of a physical machine, the delay is low, and any extra CPU overhead is hardly caused. Moreover, a front-end drive (that is, the FE) of the I/O virtual device is in the VM, so the FE transfers data through a back-end drive (that is, the BE) in the Host, and the VM does not perceive a real physical device of the Host, which is convenient for transition and implementation of device sharing, thereby implementing the optimization of compatibility of a virtualization system.

BRIEF DESCRIPTION OF THE DRAWINGS

To make the technical solutions of the embodiments of the present invention or the prior art clearer, the accompanying drawings used in the description of the embodiments or the prior art are briefly described hereunder. Evidently, the accompanying drawings illustrate some exemplary embodiments of the present invention and persons of ordinary skill in the art may obtain other drawings based on these drawings without creative efforts.

FIG. 2-*a* is a schematic architectural diagram of a virtualization software and hardware system provided in an embodiment of the present invention;

FIG. 2-*b* is a schematic architectural diagram of another virtualization software and hardware system provided in an embodiment of the present invention;

FIG. 6-*a* is a schematic flow chart of another virtualization processing method provided in an embodiment of the present invention;

FIG. 6-*b* is a schematic diagram of GPA and HPA address translation provided in an embodiment of the present invention;

FIG. 7-*a* is a schematic flow chart of another virtualization processing method provided in an embodiment of the present invention;

FIG. 7-*b* is a schematic diagram of another GPA and HPA address translation provided in an embodiment of the present invention;

FIG. 8-*a* is a schematic flow chart of another virtualization processing method provided in an embodiment of the present invention;

FIG. 8-*b* is a schematic diagram of another GPA and HPA address translation provided in an embodiment of the present invention;

FIG. 9-*a* is a schematic flow chart of another virtualization processing method provided in an embodiment of the present invention;

FIG. 9-*b* is a schematic diagram of another GPA and HPA address translation provided in an embodiment of the present invention;

FIG. 10 is a schematic diagram of module architecture of a host provided in an embodiment of the present invention;

FIG. 11-*a* is a schematic diagram of a computing node provided in an embodiment of the present invention;

FIG. 11-*b* is a schematic diagram of another computing node provided in an embodiment of the present invention;

FIG. 11-*c* is a schematic diagram of another computing node provided in an embodiment of the present invention; and FIG. 12 is a schematic diagram of a computer system provided in an embodiment of the present invention.

DETAILED DESCRIPTION OF THE EMBODIMENTS

Figure 1:
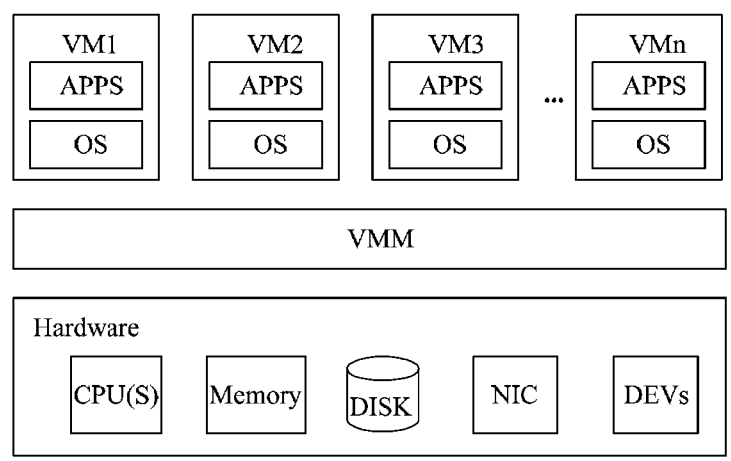
FIG. 1 is a schematic architectural diagram of a conventional virtualization technology.

Embodiments of the present invention provide a virtualization processing method and apparatuses, and a computer system, so as to optimize the performance and compatibility of a virtualization system.

In order to make the solutions of the present invention more comprehensible for persons skilled in the art, the technical solutions in the embodiments of the present invention are clearly and completely described below with reference to the accompanying drawings in the embodiments of the present invention. It is obvious that the embodiments to be described are only a part rather than all of the embodiments of the present invention. All other embodiments derived by persons of ordinary skill in the art based on the embodiments of the present invention without creative efforts shall fall within the protection scope of the present invention.

In order to conveniently understand embodiments of the present invention, several elements that will be introduced in the description of the embodiments of the present invention are illustrated herein first.

Virtual Machine VM:

One or more virtual computers can be simulated on a physical computer through virtual machine software, and those virtual machines work as real computers, a virtual machine can have an operating system and application programs installed, and the virtual machine can still access network resources. For an application program running in the virtual machine, the virtual machine works just like in a real computer.

Hardware Layer:

A hardware platform running in a virtualization environment. The hardware layer may include multiple types of hardware, for example, a hardware layer of a computing node may include a CPU and a memory, and may include high speed/low speed input/output (I/O, Input/Output) devices, such as a network card and a storage, and other devices having specific processing functions, such as an input/output memory management unit (IOMMU, Input/Output Memory Management Unit), where the IOMMU may be configured to translate a virtual machine physical address and a Host physical address.

I/O Virtual Function:

A corresponding physical function (PF, Physical Function) device and several virtual function (VF, Virtual Function) devices can be virtualized from the I/O device having an I/O virtual function after the I/O virtual function is enabled, where the PF device virtualized from the I/O device is mainly responsible for a management function, and a VF device is mainly responsible for a processing function.

Host (Host):

The host, as a management layer, is configured to complete management and allocation for hardware resources; present a virtual hardware platform for a virtual machine; and implement scheduling and isolation of the virtual machine. The Host may be a virtual machine monitor (VMM); and moreover, sometimes, a VMM may combine with one prerogative virtual machine to form a Host. The virtual hardware platform provides various hardware resources for virtual machines running on the platform, for example, provides a virtual CPU, a memory, a virtual disk, a virtual network card, and so on. The virtual disk may be corresponding to one file or one logic block device of the Host. The virtual machine is running on the virtual hardware platform prepared by the Host, and the Host may have one or more virtual machines running on the host.

Referring to FIG. 2-a and FIG. 2-b, FIG. 2-a and FIG. 2-b are schematic architectural diagrams of software and hardware systems of two virtualization solutions provided in embodiments of the present invention. System architecture mainly includes three layers: a hardware layer, a Host and a virtual machine (VM). The hardware layer shown in FIG. 2-a or FIG. 2-b includes an I/O device, and the hardware layer shown in FIG. 2-a further includes an IOMMU. The Host is running on the hardware layer, and at least one virtual machine VM is running on the Host, where several corresponding virtual function VF devices are virtualized from the I/O device, the Host has several VF software instances, the several VF software instances and the several VF devices are in one-to-one correspondence; the Host further has a back-end instance (BE, Back-End) of an I/O virtual device having the same type with the I/O device, the VM has a front-end instance (FE, Front-End) of the I/O virtual device; the BE in the Host is bound with an idle VF software instance. In the technical solution of an embodiment of the present invention, the BE in the VM may be considered as a front-end driver of the I/O virtual device, the FE in the Host may be considered as a back-end driver of the I/O virtual device, and the I/O virtual device is composed of the BE and the FE.

A virtualization processing method according to an embodiment of the present invention can be applied to a computing node, where the computing node comprises: a hardware layer, a Host running on the hardware layer, and at least one VM running on the Host, the hardware layer includes an input/output I/O device, the virtualization processing method may include: after an I/O virtual function of the input/output I/O device is enabled, generating several virtual function (VF, Virtual Function) software instances in the Host; several corresponding virtual function (VF) devices are virtualized from the I/O device with the I/O virtual function enabled; the several VF software instances and the several VF devices are in one-to-one correspondence; creating, by the Host, an I/O virtual device having the same type with the I/O device, where a back-end instance BE of the I/O virtual device is created in the Host, a front-end instance FE of the I/O virtual device is created in the initiated VM; and binding the BE with an idle VF software instance.

Figure 3:
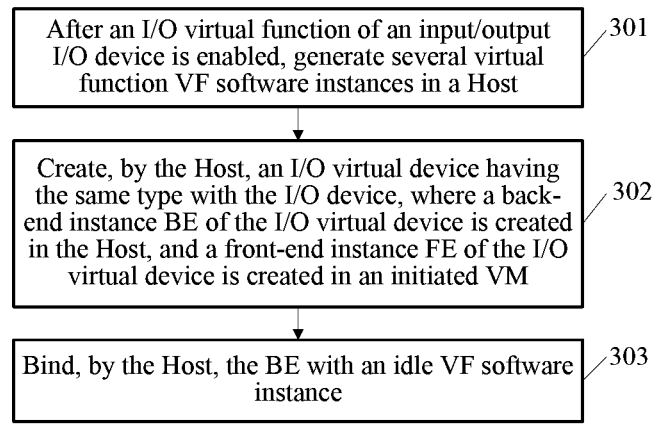
FIG. 3 is a schematic flow chart of a virtualization processing method provided in an embodiment of the present invention.

Referring to FIG. 3, a virtualization processing method provided in an embodiment of the present invention may include:

301. After an I/O virtual function of an input/output I/O device is enabled, generate several virtual function VF software instances (VF Instance) in a Host;

where, several corresponding VF devices can be virtualized from the I/O device with the I/O virtual function enabled; the several VF software instances and the several VF devices are in one-to-one correspondence. For example, the Host may enable the I/O virtual function of the I/O device when being initiated or at a certain moment after being initiated, so as to enable the I/O virtual function of the I/O device. Alternatively, the I/O device may enable its I/O virtual function automatically after the device is powered on, and in this case, it is unnecessary for the Host to enable the I/O virtual function of the I/O device.

It should be noted that, the I/O device mentioned in the embodiment of the present invention may be, for example, a peripheral component interconnect express (PCIe, Peripheral Component Interconnect Express) device or a device of another type, such as a network card.

302. Create, by the Host, an I/O virtual device having the same type with the I/O device, where a back-end instance (BE, Back-End) of the I/O virtual device (vDEV) is created in the Host, and a front-end instance (FE, Front-End) of the I/O virtual device is created in an initiated VM.

303. Bind, by the Host, the BE with an idle VF software instance.

If the Host creates several I/O virtual devices having the same type with the I/O device, a back-end instance BE of each I/O virtual device is bound with an idle VF software instance, and an inter-access interface between the BE and the VF software instance that are in binding relationship exists, for example, the BE can access a VF device corresponding to the VF software instance through an access interface provided by the VF software instance bound with the BF. In this way, the application architecture in which each VM can independently use one VF device is established, a channel between one VF device virtualized from the I/O device and a front-end instance FE in one VM is got through, so that the FE can access the VF device through the BE in the Host. The VF device virtualized from the I/O device is separately allocated to the VM for use, so it is beneficial for the VM to acquire the performance similar to that of a physical machine. Based on the application architecture constructed by the Host, the VM can send data, receive data, or perform data processing in other forms.

For example, in FIG. 2-a and FIG. 2-b, several corresponding VF devices can be virtualized from the I/O device (such as a PCIe device) with the I/O virtual function enabled, and a corresponding physical function (PF, Physical Function) device can further be virtualized from the I/O device with the I/O virtual function enabled, back-end instances BEs of several I/O virtual devices that have the same type with the I/O device and are created by the Host are located in the Host, and a front-end instance FE of each I/O virtual device is located in a different VM. A shared memory may further be configured between the Host and the VM, and the back-end instance BE and the front-end instance FE of the I/O virtual device may, for example, transfer data through the shared memory.

It can be seen that, in this embodiment, after the I/O virtual function of the input/output I/O device is enabled, several VF software instances are generated in the Host; several corresponding VF devices are virtualized from the I/O device with the I/O virtual function enabled; the several VF software instances and the several VF devices are in one-to-one correspondence; the Host creates an I/O virtual device having the same type with the I/O device, where a back-end instance BE of the I/O virtual device is created in the Host, and a front-end instance FE of the I/O virtual device is created in the initiated VM; the BE is bound with the idle VF software instance. In this way, the application architecture in which each VM can independently use one VF device is established, a channel between one VF device virtualized from the I/O device and the front-end instance FE in one VM is got through, so that the FE can access the VF device through the BE in the Host. The VF device virtualized from the I/O device is separately allocated to the VM for use, and the VF device can provide a high-efficient device interface, so it is beneficial for the VM to acquire the performance similar to that of a physical machine, the delay is low and any additional CPU overhead is hardly caused. Moreover, a front-end drive (that is, the FE) of the virtual device is in the VM, so data is transferred through a back-end drive (that is, the BE) in the Host, and the VM does not perceive a real physical device of the Host, which is convenient for transition and implementation of device sharing, thereby implementing the optimization of compatibility of a virtualization system.

Figure 4:
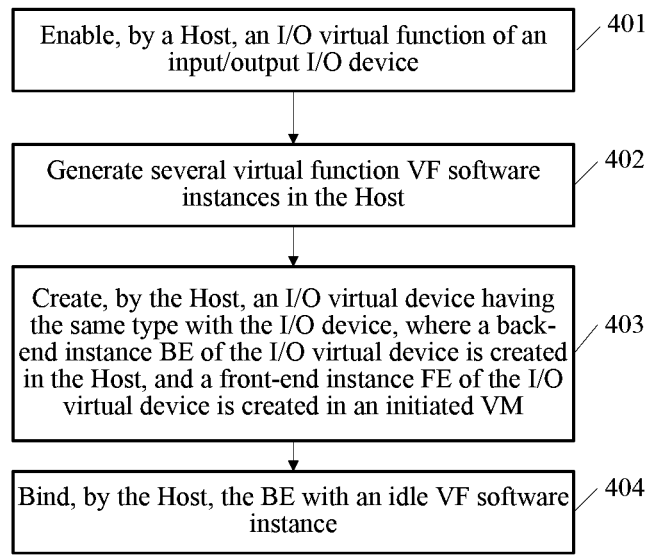
FIG. 4 is a schematic flow chart of another virtualization processing method provided in an embodiment of the present invention.

Referring to FIG. 4, another virtualization processing method provided in an embodiment of the present invention is applied to a computing node, the computing node includes: a hardware layer, a Host running on the hardware layer, and at least one VM running on the Host, where the hardware layer includes an input/output I/O device, the method may include:

401. Enable, by the Host, an I/O virtual function of the input/output I/O device.

For example, the Host may enable the I/O virtual function of the I/O device when being initiated or at a certain moment after being initiated, so as to enable the I/O virtual function of the I/O device. Several corresponding VF devices are virtualized from the I/O device with the I/O virtual function enabled. Alternatively, the I/O device may enable its I/O virtual function automatically after the device is powered on, and in this case, it is unnecessary for the Host to enable the I/O virtual function of the I/O device.

402. Generate several VF software instances in the Host, where several corresponding VF devices can be virtualized from the I/O device with the I/O virtual function enabled, and the several VF software instances and the several VF devices are in one-to-one correspondence.

403. Create, by the Host, an I/O virtual device having the same type with the I/O device, where a back-end instance BE of the I/O virtual device (vDEV) is created in the Host, and a front-end instance FE of the I/O virtual device is created in an initiated VM.

404. Bind, by the Host, the BE with an idle VF software instance.

If the Host creates several I/O virtual devices having the same type with the I/O device, a back-end instance BE of each I/O virtual device is bound with an idle VF software instance, and an inter-access interface between the BE and the VF software instance that are in binding relationship exists, for example, the BE can access the VF device corresponding to the VF software instance through an access interface provided by the VF software instance bound with the BE. In this way, the application architecture in which each VM can independently use one VF device is established, a channel between one VF device virtualized from the I/O device and the front-end instance FE in the VM is got through, so that the FE can access the VF device through the BE in the Host. The VF device virtualized from the I/O device is separately allocated to the VM for use, so it is beneficial for the VM to acquire the performance similar to that of a physical machine. Based on the application architecture constructed by the Host, the VM can send data, receive data, or perform data processing in other forms.

For example, in FIG. 2-a and FIG. 2-b, several corresponding VF devices can be virtualized from the I/O device (such as a PCIe device) with the I/O virtual function enabled, and a corresponding physical function PF device can further be virtualized from the I/O device with the I/O virtual function enabled (the Host may further generate a PF software instance corresponding to the PF device), back-end instances BEs of several I/O virtual devices that have the same type with the I/O device and are created by the Host are located in the Host, and a front-end instance FE of each I/O virtual device is located in a different VM. A shared memory may further be configured between the Host and the VM, and the back-end instance BE and the front-end instance FE of the I/O virtual device can, for example, transfer data through the shared memory.

For ease of understanding, an optional interaction manner of application architecture constructed based on the foregoing mechanism is illustrated below by taking a procedure of receiving data as an example.

In an application scenario, after the Host binds the BE and the idle VF software instance, the FE may pre-allocate a cache for direct memory access (DMA, Direct Memory Access); the FE may write a guest physical address (GPA, Guest Physical Address) corresponding to the pre-allocated cache for DMA into the shared memory between the Host and the VM; through an exporting application programming interface of the BE, the VF software instance bound with the BE may acquire the GPA corresponding to the cache for DMA; the VF software instance may write the acquired GPA corresponding to the cache for DMA into a receiving queue of a VF device corresponding to the VF software instance; when there is data to be received, the VF device may select the GPA corresponding to the cache for DMA from the receiving queue of the VF device, and may initiate a DMA write request (the DMA write request is used to write data into the cache) by using the selected GPA as a target address; an input/output memory management unit IOMMU modifies the target address GPA of the DMA write request into a corresponding Host physical address HPA (where, an address translation page table, for example, is set in the IOMMU, the address translation page table records mapping between the HPA and the GPA; when the DMA write request passes, the IOMMU may acquire an HPA corresponding to the target address GPA of the DMA write request by looking up the address translation page table, and modify the target address GPA of the DMA write request to the acquired HPA); after the DMA write request whose target address is modified to the HPA is executed, the VF device may notify the VF software instance which is corresponding to the VF device and is in the Host, so that the VF software instance triggers a corresponding FE to receive data written into a cache corresponding to the HPA.

In another application scenario, after the Host binds the BE and the idle VF software instance, the FE may pre-allocate a cache for DMA; the FE may write a GPA corresponding to the pre-allocated cache for DMA into the shared memory between the Host and the VM; the Host (for example, the BE or another module in the Host) may modify the GPA corresponding to the cache for DMA to a corresponding HPA (for example, an address translation page table is set in the Host, the address translation page table records mapping between the HPA and the GPA; by looking up the address translation page table, the Host (for example, the BE or another module in the Host) may acquire an HPA corresponding to the GPA that is corresponding to the cache for DMA, and modify the GPA corresponding to the cache for DMA to the acquired HPA); the VF software instance bound with the BE in the Host acquires, through the exporting application programming interface of the BE, the HPA corresponding to the cache for DMA; the acquired HPA corresponding to the cache for DMA is written into a receiving queue of a VF device corresponding to the VF software instance; when there is data to be received, the VF device selects the HPA corresponding to the cache for DMA from the receiving queue of the VF device, and initiates a DMA write request (the DMA write request is used to write data in the cache) by using the selected HPA as a target address; after the DMA write request is executed, the VF device may further notify the VF software instance which is corresponding to the VF device and is in the Host, so that the VF software instance triggers a corresponding FE to receive data written into a cache corresponding to the HPA.

For ease of understanding, an optional interaction manner of application architecture constructed based on the foregoing mechanism is illustrated below by taking a procedure of sending data as an example.

In an application scenario, after the Host binds the BE and the idle VF software instance, the FE may write a GPA corresponding to the cache where data to be sent locates into the shared memory between the Host and the VM; a corresponding BE may invoke a program sending interface of the VF software instance bound with the BE, and write the GPA corresponding to the cache where data to be sent locates into a sending queue of a VF device corresponding to the VF software instance; after finding that there is data to be sent, the VF device initiates a DMA read request (the DMA write request is used to read data from the cache) by using the GPA recorded in the sending queue of the the VF device as a target address; and the IOMMU modifies the target address GPA of the DMA read request into a corresponding HPA (where, an address translation page table, for example, is set in the IOMMU, the address translation page table records mapping between the HPA and the GPA; when the DMA read request passes, the IOMMU may acquire an HPA corresponding to the target address GPA of the DMA read request by looking up the address translation page table, and modify the target address GPA of the DMA read request to the acquired HPA). Further, after the DMA read request is executed, the VF device may notify the VF software instance which is corresponding to the VF device and is in the Host, so that the VF software instance triggers a corresponding FE to release the corresponding cache.

In another application scenario, after the Host binds the BE and the idle VF software instance, the FE may write the GPA corresponding to the cache where data to be sent locates into the shared memory between the Host and the VM; the Host (for example, the BE or another module in the Host) may modify the GPA corresponding to the cache to a corresponding HPA (for example, an address translation page table is set in the Host, the address translation page table records mapping between the HPA and the GPA; by looking up the address translation page table, the Host (for example, the BE or another module in the Host) may acquire an HPA corresponding to the GPA that is corresponding to the cache, and modify the GPA corresponding to the cache to the acquired HPA), the corresponding BE may invoke a program sending interface of the VF software instance bound with the BE, and write the HPA corresponding to the cache where the data to be sent locates into the sending queue of a VF device corresponding to the VF software instance; when finding that there is data to be sent, the VF device initiates a DMA read request by using the HPA recorded in the sending queue of the VF device as a target address. Further, after the DMA read request is executed, the VF device may notify the VF software instance which is corresponding to the VF device and is in the Host, so that the VF software instance triggers a corresponding FE to release the corresponding cache.

The optional interaction manner of the application architecture constructed based on the foregoing mechanism is illustrated below by taking procedures of sending data and receiving data as examples, and interaction manners in other application scenarios can be deduced through analog.

It can be seen that, in this embodiment, after the I/O virtual function of the input/output I/O device is enabled, several VF software instances are generated in the Host; several corresponding VF devices are virtualized from the I/O device with the I/O virtual function enabled; the several VF software instances and the several VF devices are in one-to-one correspondence; the Host creates an I/O virtual device having the same type with the I/O device, where a back-end instance BE of the I/O virtual device is created in the Host, and a front-end instance FE of the I/O virtual device is created in an initiated VM; the BE is bound with the idle VF software instance. In this way, the application architecture in which each VM can independently use one VF device is established, a channel between one VF device virtualized from the I/O device and the front-end instance FE in one VM is got through, so that the FE can access the VF device through the BE in the Host. The VF device virtualized from the I/O device is separately allocated to the VM for use, and the VF device can provide a high-efficient device interface, so it is beneficial for the VM to acquire the performance similar to that of a physical machine, the delay is low, and any additional CPU overhead is hardly caused. Moreover, a front-end drive (that is, the FE) of the virtual device is in the VM, so data is transferred through a back-end drive (that is, the BE) in the Host, and the VM does not perceive a real physical device of the Host, which is convenient for transition and implementation of device sharing, thereby implementing the optimization of compatibility of a virtualization system.

An embodiment of the present invention further provides a virtualization processing method, which is applied to a computing node, the computing node may include: a hardware layer, a Host running on the hardware layer, and at least one VM running on the Host, where the hardware layer includes an input/output I/O device, several corresponding virtual function VF devices are virtualized from the I/O device, the Host has several VF software instances, the several VF software instances and the several VF devices are in one-to-one correspondence; the Host further has a back-end instance BE of an I/O virtual device having the same type with the I/O device, the VM has a front-end instance FE of the I/O virtual device; the BE in the Host is bound with an idle VF software instance, the method includes: pre-allocating, by the FE, a cache for direct memory access DMA; acquiring, by the VF software instance bound with the BE, an address corresponding to the cache for DMA through an exporting application programming interface of the BE, writing the acquired address corresponding to the cache for DMA into a first storage unit of a VF device corresponding to the VF software instance; selecting, by the VF device, the address corresponding to the cache for DMA from the first storage unit when there is data to be received, and initiating a DMA write request by using the selected address corresponding to the cache for DMA as a target address; notifying, by the VF device, the VF software instance which is corresponding to the VF device and is in the Host after the DMA write request is executed, so that the VF software instance triggers the FE to receive data written into the cache corresponding to the address.

Figure 5:
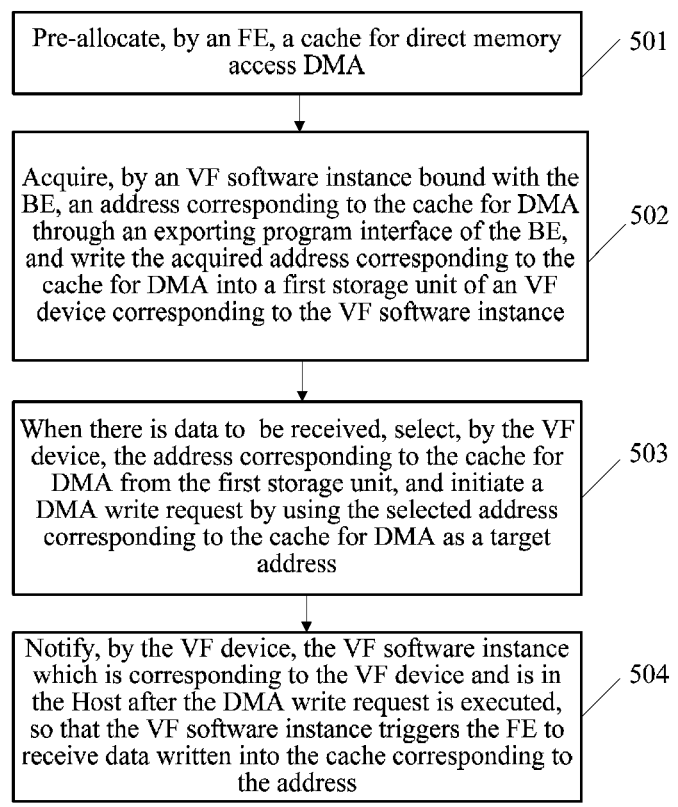
FIG. 5 is a schematic flow chart of another virtualization processing method provided in an embodiment of the present invention.

Referring to FIG. 5, another virtualization processing method in an embodiment of the present invention may include the following steps:

501. Pre-allocate, by the FE, a cache for direct memory access DMA.

502. Acquire, by the VF software instance bound with the BE, an address (the address is, for example, the HPA or GPA) corresponding to the cache for DMA through an exporting application programming interface of the BE, and write the acquired address corresponding to the cache for DMA into a first storage unit of a VF device corresponding to the VF software instance (where, the first storage unit is, for example, a receiving queue or receiving list of the VF device or another data storage structure capable of recording an address).

503. Select, by the VF device, the address corresponding to the cache for DMA from the first storage unit when there is data to be received, and initiate a DMA write request by using the selected address corresponding to the cache for DMA as a target address.

504. Notify, by the VF device, the VF software instance which is corresponding to the VF device and is in the Host after the DMA write request is executed, so that the VF software instance triggers the FE to receive data written into the cache corresponding to the address.

It can be seen that, in this embodiment, the computing node may include: a hardware layer, a Host running on the hardware layer, and at least one VM running on the Host, where the hardware layer includes an input/output I/O device, several corresponding virtual function VF devices are virtualized from the I/O device, the Host has several VF software instances, the several VF software instances and the several VF devices are in one-to-one correspondence; the Host further has a back-end instance BE of an I/O virtual device having the same type with the I/O device, the VM has a front-end instance FE of the I/O virtual device; the BE in the Host is bound with an idle VF software instance. In this way, the application architecture in which each VM can independently use one VF device is established, and a channel between one VF device virtualized from the I/O device and the front-end instance FE in one VM is got through, so that the FE can access the VF device through the BE in the Host. The VF device virtualized from the I/O device is separately allocated to the VM for use, and the VF device can provide a high-efficient device interface, so it is beneficial for the VM to acquire the performance similar to that of a physical machine, the delay is low and any additional CPU overhead is hardly caused. Moreover, a front-end drive (that is, the FE) of the I/O virtual device is in the VM, so the FE transfers data through a back-end drive (that is, the BE) in the Host, and the VM does not perceive a real physical device of the Host, which is convenient for transition and implementation of device sharing, thereby implementing the optimization of compatibility of a virtualization system.

In an embodiment of the present invention, after the FE pre-allocates the cache for DMA, the FE may write the GPA corresponding to the pre-allocated cache for DMA into the shared memory between the Host and the VM; the VF software instance bound with the BE may acquire the GPA corresponding to the cache for DMA from the shared memory through the exporting application programming interface of the BE (definitely, the FE may also notify the GPA corresponding to the pre-allocated cache for DMA to the corresponding BE; and the VF software instance bound with the BE may acquire the GPA corresponding to the cache for DMA through the exporting application programming interface of the BE), write the acquired GPA corresponding to the cache for DMA into the first storage unit of the VF device corresponding to the VF software instance; and when there is data to be received, the VF device may select the GPA corresponding to the cache for DMA from the first storage unit, and initiate the DMA write request by using the GPA corresponding to the cache for DMA as the target address; the IOMMU may modify the target address GPA of the DMA write request into the corresponding HPA (for example, an address translation page table, for example, is set in the IOMMU, the address translation page table records mapping between the HPA and the GPA; the IOMMU acquires an HPA corresponding to the target address GPA of the DMA write request by looking up the address translation page table, and modifies the target address GPA of the DMA write request to the acquired HPA); after the DMA write request whose target address GPA is modified to the HPA is executed, the VF device notify the VF software instance which is corresponding to the VF device and is in the Host, so that the VF software instance triggers the FE to receive data written into the cache corresponding to the HPA.

In another application scenario, after the FE pre-allocates the cache for DMA, the FE may write a GPA corresponding to the pre-allocated cache for DMA into the shared memory between the Host and the VM; the Host may modify the GPA corresponding to the cache for DMA in the shared memory to a corresponding HPA (for example, an address translation page table is set in the Host, the address translation page table records mapping between the HPA and the GPA; by looking up the address translation page table, the Host may acquire an HPA corresponding to the GPA that is corresponding to the cache for DMA in the shared memory, and modify the GPA corresponding to the cache for DMA in the shared memory to the acquired HPA. Definitely, the FE may also notify the GPA corresponding to the pre-allocated cache for DMA to the corresponding BE, and the Host may modify the GPA corresponding to the cache for DMA to the corresponding HPA); the VF software instance bound with the BE acquires, through the exporting application programming interface of the BE, the HPA corresponding to the cache for DMA; the acquired HPA corresponding to the cache for DMA is written into a first storage unit of the VF device corresponding to the VF software instance; when there is data to be received, the VF device selects the HPA corresponding to the cache for DMA from the first storage unit, and initiates a DMA write request by using the selected HPA as a target address.

In an embodiment of the present invention, when the FE has data to be sent, the FE may write the GPA corresponding to the cache where data to be sent locates into the shared memory between the Host and the VM; the BE may acquire the GPA corresponding to the cache where data to be sent locates from the shared memory (definitely, the FE may also notify the GPA corresponding to the cache where data to be sent locates to the corresponding BE, and the BE acquires, according to the notification, the GPA corresponding to the cache where data to be sent locates); the BE invokes a program sending interface of the VF software instance bound with the BE, and writes the GPA corresponding to the cache where data to be sent locates into a second storage unit of the VF device corresponding to the VF software instance (where the second storage unit is, for example, a sending queue or a sending list of the VF device or another data storage structure capable of recording an address); when finding that there is data to be sent, the VF device initiates a DMA read request by using the GPA recorded in the second storage unit as the target address; the IOMMU may modify the target address GPA of the DMA read request to a corresponding HPA (for example, an address translation page table is set in the IOMMU, the address translation page table records mapping between the HPA and the GPA; the IOMMU acquires an HPA corresponding to the target address GPA of the DMA read request by looking up the address translation page table, and modifies the target address GPA of the DMA read request to the acquired HPA). Further, after the DMA read request is executed, the VF device may notify the VF software instance which is corresponding to the VF device and is in the Host, so that the VF software instance triggers the FE to release the corresponding cache.

In another embodiment of the present invention, when the FE has data to be sent, the FE may write the GPA corresponding to the cache where data to be sent locates into the shared memory between the Host and the VM; the Host modifies the GPA corresponding to the cache where data to be sent locates in the shared memory to the corresponding HPA (for example, an address translation page table is set in the Host, the address translation page table records mapping between the HPA and the GPA; by looking up the address translation page table, the Host acquires the HPA corresponding to the GPA that is corresponding to the cache where data to be sent locates in the shared memory, and modifies the GPA corresponding to the cache where data to be sent locates in the shared memory to the corresponding HPA. Definitely, the FE may also notify the GPA corresponding to the cache where data to be sent locates to the Host, and the Host modifies the GPA corresponding to the cache where data to be sent locates to the corresponding HPA); the BE acquires the HPA corresponding to the cache where the data to be sent locates, invokes a program sending interface of the VF software instance bound with the BE, and writes the HPA corresponding to the cache where the data to be sent locates into the second storage unit of the VF device corresponding to the VF software instance (where the second storage unit is, for example, a sending queue or a sending list of the VF device or another data storage structure capable of recording an address); when finding that there is data to be sent, the VF device initiates a DMA read request by using the HPA recorded in the second storage unit as a target address. Further, after the DMA read request is executed, the VF device may notify the VF software instance which is corresponding to the VF device and is in the Host, so that the VF software instance triggers the FE to release the corresponding cache.

For better understand and implement the foregoing solutions in the embodiments of the present invention, further illustration is made by taking several specific application scenarios of data receiving and data sending as examples.

Referring to FIG. 6-a, another virtualization processing method provided in an embodiment of the present invention may include:

601. Enable, by the Host, the IOMMU;

where, the Host may enable the IOMMU when being initiated or at a certain moment after being initiated; definitely, the IOMMU may also enable the corresponding function automatically when the device is powered on, and in this case, it is unnecessary for the Host to enable the IOMMU; and definitely, another module may also be used to enable the IOMMU.

602. Install drivers of a PF device and a VF device in the Host, where the PF device and the VF device are corresponding to the I/O device (for example, referred to as E-1).

603. Enable, by the Host, an I/O virtual function of the I/O device E-1;

where, for example, the Host may enable the I/O virtual function of the I/O device E-1 when being initiated or at a certain moment after being initiated. A corresponding physical function PF device and several virtual function VF devices can be virtualized from the I/O device E-1 with the I/O virtual function enabled, definitely, another module may be used to enable the I/O device E-1, and definitely, the I/O device E-1 may also automatically enable its I/O virtual function when the device is powered on, and in this case, it is unnecessary for the Host or another module to enable the I/O virtual function of the I/O device E-1. The PF device virtualized from the I/O device E-1 is mainly responsible for a management function, and the VF device is mainly responsible for a processing function.

604. Generate a PF software instance and several VF software instances in the Host; where the corresponding PF device and several VF devices can be virtualized from the I/O device E-1 with the I/O virtual function enabled; the several VF software instances and the several VF devices are in one-to-one correspondence, and the PF software instance generated in the Host is corresponding to the PF device virtualized from the I/O device E-1.

605. Create, by the Host, an I/O virtual device (for example, referred to as vE-1) having the same type with the I/O device E-1;

where, a back-end instance BE (for example, referred to as BE-1) of the I/O virtual device vE-1 is created in the Host, and a front-end instance FE (for example, referred to as FE-1) of the I/O virtual device vE-1 is created in an initiated VM (for example, referred to as VM-1). For example, the Host may trigger the creation of a front-end instance FE-1 corresponding to the I/O virtual device vE-1 in the initiated VM-1. It may be considered that, the FE-1 created in the VM-1 and the BE-1 created in the Host commonly construct a driver of the I/O virtual device vE-1.

606. Bind, by the Host, the created BE-1 with one idle VF software instance (for example, referred to as Vfe-1);

where, the VF software instance Vfe-1, for example, is corresponding to the VF device (for example, referred to as VF-1) virtualized from the I/O device E-1. The so-called idle VF software instance is a VF software instance that is not bound with another back-end instance BE.

So far, a channel between the VF device VF-1 virtualized from the I/O device E-1 and the front-end instance FE-1 in the VM-1 is got through, in this way, the FE-1 can access the VF device VF-1 through the BE-1 in the Host. The VF device VF-1 is separately allocated to the VM-1 for use, the VF device VF-1 is virtualized from the I/O device E-1 and can provide a high-efficient device interface, so it is beneficial for the VM-1 to acquire the performance similar to that of a physical machine, the delay is low, and any additional CPU overhead is hardly caused. Moreover, a front-end drive (that is, the FE-1) of the virtual device is in the VM-1, so the data is transferred through a back-end drive (that is, the BE-1) in the Host, and the VM-1 does not perceive a real physical device of the Host, which is convenient for transition and implementation of device sharing.

607. Pre-allocate, by the FE-1, a cache for direct memory access (DMA);

For example, the cache that is used for DMA and is pre-allocated by the FE-1 may be [GPA1, Len1], . . . [GPAn, Lenn], that is, multiple sections of cache for DMA may be pre-allocated, where GPA1 represents a start address of the GPA of the cache, Len1 represents a length of the cache, and so on.

608. Write, by the FE-1, a GPA corresponding to the pre-allocated cache for DMA into a shared memory (shared Memory) between the Host and the VM-1, and notify the BE-1 (definitely, it is also possible that after performing self detection, the BE-1 finds that the GPA corresponding to the cache for DMA is written into the shared memory).

609. Acquire, by the VF software instance Vfe-1, the GPA corresponding to the cache for DMA through an exporting application programming interface of the BE-1, and write the acquired GPA corresponding to the cache for DMA into a receiving queue of the VF device VF-1 corresponding to the VF software instance Vfe-1.

610. Select, by the VF device VF-1, the GPA corresponding to the cache for DMA from the receiving queue of the the VF device when there is data to be received, and initiate a DMA write request by using the selected GPA as a target address;

where, the DMA write request initiated by the VF device VF-1 will pass the IOMMU.

611. Modify, by the IOMMU, the target address GPA of the DMA write request to a corresponding HPA;

where, for example, an address translation page table is set in the IOMMU, the address translation page table records mapping between the GPA and the HPA (for example, as shown in FIG. 6-b). When the DMA write request passes, the IOMMU may acquire an HPA corresponding to the target address GPA of the DMA write request by looking up the address translation page table, and modify the target address GPA of the DMA write request to the acquired HPA.

612. Notify, by the VF device VF-1, the corresponding VF software instance Vfe-1 in the Host after the DMA write request whose target address is modified to the HPA is executed, so that the VF software instance Vfe-1 triggers the front-end instance FE-1 in the VM-1 to receive data written into the cache corresponding to the HPA.

When being triggered by the VF software instance Vfe-1, the front-end instance FE-1 in the VM-1 may read the data written in the cache corresponding to the HPA.

It can be seen that, in this embodiment, after the I/O virtual function of the I/O device enabled by the Host is enabled, several VF software instances are generated in the Host; several corresponding VF devices are virtualized from the I/O device with the I/O virtual function enabled; the several VF software instances and the several VF devices are in one-to-one correspondence; the Host creates an I/O virtual device having the same type with the I/O device, where a back-end instance BE of the I/O virtual device is created in the Host, and a front-end instance FE of the I/O virtual device is created in the initiated VM; the BE is bound with the idle VF software instance, in this way, the application architecture in which each VM can independently use one VF device is established, and a channel between one VF device virtualized from the I/O device and the front-end instance FE in one VM is got through, so that the FE can access the VF device through the BE in the Host. The VF device virtualized from the I/O device is separately allocated to the VM for use, and the VF device can provide a high-efficient device interface, so it is beneficial for the VM to acquire the performance similar to that of a physical machine, the delay is low and any additional CPU overhead is hardly caused. Moreover, a front-end drive (that is, the FE) of the virtual device is in the VM, so data is transferred through a back-end drive (that is, the BE) in the Host, and the VM does not perceive a real physical device of the Host, which is convenient for transition and implementation of device sharing, thereby implementing the optimization of compatibility of a virtualization system.

In addition, during the procedure of executing the DMA write request, the hardware module IOMMU implements the translation between the GPA and the HPA, thereby reducing CPU overhead and further improving performance.

Referring to FIG. 7-a, another virtualization processing method provided in an embodiment of the present invention may include:

701. Install drivers of a PF device and a VF device in the Host, where the PF device and the VF device are corresponding to an I/O device (referred to as E-2).

702. Enable, by the Host, the I/O virtual function of the I/O device E-2;

where, for example, the Host may enable the I/O virtual function of the I/O device E-2 when being initiated or at a certain moment after being initiated. The corresponding physical function PF device and several virtual function VF devices can be virtualized from the I/O device E-2 with the I/O virtual function enabled by the Host, definitely, another module may be used to enable the I/O device E-2, and definitely, the I/O device E-2 may also automatically enable its I/O virtual function when the device is powered on, and in this case, it is unnecessary for the Host or another module to enable the I/O virtual function of the I/O device E-2. The PF device virtualized from the I/O device E-2 is mainly responsible for a management function, and the VF device is mainly responsible for a processing function.

703. Generate a PF software instance and several VF software instances in the Host; where a corresponding PF device and several VF devices can be virtualized from the I/O device E-2 with the I/O virtual function enabled; the several VF software instances and the several VF devices are in one-to-one correspondence, and the PF software instance generated in the Host is corresponding to the PF device virtualized from the I/O device E-2.

704. Create, by the Host, an I/O virtual device (for example, referred to as vE-2) having the same type with the I/O device E-2;

where, a back-end instance BE (for example, referred to as BE-2) of the I/O virtual device vE-2 is created in the Host, and a front-end instance FE (for example, referred to as FE-2) of the I/O virtual device vE-2 is created in the initiated VM (for example, referred to as VM-2). For example, the Host may trigger the creation of the front-end instance FE-2 corresponding to the I/O virtual device vE-2 in the initiated VM-2.

It may be considered that, the FE-2 created in the VM-2 and the BE-2 created in the Host commonly construct a driver of the I/O virtual device vE-2.

705. Bind, by the Host, the created BE-2 with one idle VF software instance (for example, referred to as Vfe-2);

where, the VF software instance Vfe-2, for example, is corresponding to the VF device (for example, referred to as VF-2) virtualized from the I/O device E-2. The so-called idle VF software instance is a VF software instance that is not bound with another back-end instance BE.

So far, a channel between the VF device VF-2 virtualized from the I/O device E-2 and the front-end instance FE-2 in the VM-2 is got through, in this way, the FE-2 can access the VF device VF-2 through the BE-2 in the Host. The VF device VF-2 is separately allocated to the VM-2 for use, the VF device VF-2 is virtualized from the I/O device E-2 and can provide a high-efficient device interface, so it is beneficial for the VM-2 to acquire the performance similar to that of a physical machine, the delay is low and any additional CPU overhead is hardly caused. Moreover, a front-end drive (that is, the FE-2) of the virtual device is in the VM-2, so the data is transferred through a back-end drive (that is, the BE-2) in the Host, and the VM-2 does not perceive a real physical device of the Host, which is convenient for transition and implementation of device sharing.

706. Pre-allocate, by the FE-2, a cache for direct memory access (DMA).

For example, the cache that is used for DMA and is pre-allocated by the FE-2 may be [GPA1, Len1], . . . [GPAn, Lenn], that is, multiple sections of cache for DMA may be pre-allocated, where GPA1 represents a start address of the GPA of the cache, Len1 represents a cache length, and so on.

707. Write, by the FE-2, a GPA corresponding to the pre-allocated cache for DMA into a shared memory (shared Memory) between the Host and the VM-2, and notify the BE-2 (definitely, it is also possible that after performing self detection, the BE-2 finds that the GPA corresponding to the cache for DMA is written into the shared memory).

708. Modify, by the Host, the GPA corresponding to the cache for DMA in the shared memory to a corresponding HPA;

where, for example, an address translation page table is set in the Host, the address translation page table records mapping between the GPA and the HPA (for example, as shown in FIG. 7-b). By looking up the address translation page table, the Host may acquire an HPA corresponding to the GPA that is corresponding to the cache for DMA, and modify the GPA corresponding to the cache for DMA to the acquired HPA.

709. Acquire, by the VF software instance Vfe-2, the HPA corresponding to the cache for DMA through an exporting application programming interface of the BE-2, and write the acquired HPA corresponding to the cache for DMA into a receiving queue of the VF device VF-2 corresponding to the VF software instance Vfe-2.

710. Select, by the VF device VF-2, the HPA corresponding to the cache for DMA from the receiving queue of the VF device when there is data to be received, and initiate a DMA write request by using the selected HPA as a target address.

711. Notify, by the VF device VF-2, the corresponding VF software instance Vfe-2 in the Host after the DMA write request is executed, so that the VF software instance Vfe-2 triggers the front-end instance FE-2 in the VM-2 to receive data written into the cache corresponding to the HPA.

When being triggered by the VF software instance Vfe-2, the front-end instance FE-2 in the VM-2 may read the data written in the cache corresponding to the HPA.

It can be seen that, in this embodiment, after the I/O virtual function of the input/output I/O device enabled by the Host is enabled, several VF software instances are generated in the Host; several corresponding VF devices are virtualized from the I/O device with the I/O virtual function enabled; the several VF software instances and the several VF devices are in one-to-one correspondence; the Host creates an I/O virtual device having the same type with the I/O device, where a back-end instance BE of the I/O virtual device is created in the Host, and a front-end instance FE of the I/O virtual device is created in the initiated VM; the BE is bound with the idle VF software instance, in this way, the application architecture in which each VM can independently use one VF device is established, a channel between one VF device virtualized from the I/O device and the front-end instance FE in one VM is got through, so that the FE can access the VF device through the BE in the Host. The VF device virtualized from the I/O device is separately allocated to the VM for use, and the VF device can provide a high-efficient device interface, so it is beneficial for the VM to acquire the performance similar to that of a physical machine, the delay is low and any additional CPU overhead is hardly caused. Moreover, a front-end drive (that is, the FE) of the virtual device is in the VM, so data is transferred through a back-end drive (that is, the BE) in the Host, and the VM does not perceive a real physical device of the Host, which is convenient for transition and implementation of device sharing, thereby implementing the optimization of compatibility of a virtualization system.

In addition, during the procedure of executing the DMA write request, the Host implements the translation between the GPA and the HPA, thereby reducing hardware resource configuration, and simplifying the processing flow.

Referring to FIG. 8-a, another virtualization processing method provided in an embodiment of the present invention may include:

801. Enable, by the Host, the IOMMU;

where, the Host may enable the IOMMU when being initiated or at a certain moment after being initiated; definitely, the IOMMU may also enable the corresponding function automatically when the device is powered on, and in this case, it is unnecessary for the Host to enable the IOMMU; and definitely, another module may also be used to enable the IOMMU.

802. Install drivers of a PF device and a VF device in the Host, where the PF device and the VF device are corresponding to the I/O device (for example, referred to as E-3).

803. Enable, by the Host, an I/O virtual function of the I/O device E-3;

where, for example, the Host may enable the I/O virtual function of the I/O device E-3 when being initiated or at a certain moment after being initiated. The corresponding physical function PF device and several virtual function VF devices can be virtualized from the I/O device E-3 with the I/O virtual function enabled, definitely, another module may be used to enable the I/O device E-3, and definitely, the I/O device E-3 may also automatically enable its I/O virtual function when the device is powered on, and in this case, it is unnecessary for the Host or another module to enable the I/O virtual function of the I/O device E-3. The PF device virtualized from the I/O device E-3 is mainly responsible for a management function, and the VF device is mainly responsible for a processing function.

804. Generate a PF software instance and several VF software instances in the Host; where the corresponding PF device and several VF devices can be virtualized from the I/O device E-3 with the I/O virtual function enabled; the several VF software instances and the several VF devices are in one-to-one correspondence, and the PF software instance generated in the Host is corresponding to the PF device virtualized from the I/O device E-3.

805. Create, by the Host, an I/O virtual device (for example, referred to as vE-3) having the same type with the I/O device E-3;

where, a back-end instance BE (for example, referred to as BE-3) of the I/O virtual device vE-3 is created in the Host, and a front-end instance FE (for example, referred to as FE-3) of the I/O virtual device vE-3 is created in the initiated VM (for example, referred to as VM-3). For example, the Host may trigger the creation of a front-end instance FE-3 corresponding to the I/O virtual device vE-3 in the initiated VM-3. It may be considered that, the FE-3 created in the VM-3 and the BE-3 created in the Host commonly construct a driver of the I/O virtual device vE-3.

806. Bind, by the Host, the created BE-3 with one idle VF software instance (for example, referred to as Vfe-3);

where, the VF software instance Vfe-3, for example, is corresponding to the VF device (for example, referred to as VF-3) virtualized from the I/O device E-3. The so-called idle VF software instance is a VF software instance that is not bound with another back-end instance BE.

So far, a channel between the VF device VF-3 virtualized from the I/O device E-3 and the front-end instance FE-3 in the VM-3 is got through, in this way, the FE-3 can access the VF device VF-3 through the BE-3 in the Host. The VF device VF-3 is separately allocated to the VM-3 for use, the VF device VF-3 is virtualized from the I/O device E-3 and can provide a high-efficient device interface, so it is beneficial for the VM-3 to acquire the performance similar to that of a physical machine, the delay is low and any additional CPU overhead is hardly caused. Moreover, a front-end drive (that is, the FE-3) of the virtual device is in the VM-3, so the data is transferred through a back-end drive (that is, the BE-3) in the Host, and the VM-3 does not perceive a real physical device of the Host, which is convenient for transition and implementation of device sharing.

807. Write, by the front-end instance FE-3, a GPA corresponding to the cache where data to be sent locates into a shared memory between the Host and the VM-3, and notify the BE-3 (definitely, it is also possible that after performing self detection, the BE-3 finds that the GPA corresponding to the cache where data to be sent locates is written into the shared memory).

For example, the GPA corresponding to the cache where data to be sent locates is [GPA1, Len1], ... [GPAn, Lenn], that is, multiple sections of cache for DMA may be pre-allocated, where GPA1 represents a start address of the GPA of the cache, Len1 represents a cache length, and so on.

808. Invoke, by the BE-3, a program sending interface of the VF software instance Vfe-3 bound with the BE-3, and write the GPA corresponding to the cache where data to be sent locates into a sending queue of the VF device VF-3 corresponding to the VF software instance Vfe-3.

809. When finding that there is data to be sent, initiate, by the VF device VF-3, a DMA read request by using the GPA recorded in the sending queue of the the VF device as a target address;

where, the VF device VF-3, for example, may detect the sending queue of the the VF device periodically or non-periodically, and when finding that a GPA is newly written into the sending queue, consider that there is data to be sent, or, the VF software instance Vfe-3 may notify the VF device VF-3 after a GPA is newly written into the sending queue;

where, the DMA read request initiated by the VF device VF-3 will pass the IOMMU.

810. Modify, by the IOMMU, the target address GPA of the DMA read request to a corresponding HPA;

where, for example, an address translation page table is set in the IOMMU, the address translation page table records mapping between the GPA and the HPA (for example, as shown in FIG. 8-b). When the DMA read request passes, the IOMMU may acquire an HPA corresponding to the target address GPA of the DMA read request by looking up the address translation page table, and modify the target address GPA of the DMA read request to the acquired HPA.

811. Notify, by the VF device VF-3, the corresponding VF software instance Vfe-3 in the Host after the DMA read request whose target address is modified to the HPA is executed, so that the VF software instance Vfe-3 triggers the front-end instance FE-3 in the VM-3 to release the cache corresponding to the HPA.

When being triggered by the VF software instance Vfe-3, the front-end instance FE-3 in the VM-3 may release the cache corresponding to the HPA, so as to cache new data. It can be seen that, in this embodiment, after the I/O virtual function of the input/output I/O device enabled by the Host is enabled, several VF software instances are generated in the Host; several corresponding VF devices are virtualized from the I/O device with the I/O virtual function enabled; the several VF software instances and the several VF devices are in one-to-one correspondence; the Host creates an I/O virtual device having the same type with the I/O device, where a back-end instance BE of the I/O virtual device is created in the Host, and a front-end instance FE of the I/O virtual device is created in the initiated VM; the BE is bound with the idle VF software instance, in this way, the application architecture in which each VM can independently use one VF device is established, a channel between one VF device virtualized from the I/O device and the front-end instance FE in one VM is got through, so that the FE can access the VF device through the BE in the Host. The VF device virtualized from the I/O device is separately allocated to the VM for use, and the VF device can provide a high-efficient device interface, so it is beneficial for the VM to acquire the performance similar to that of a physical machine, the delay is low and any additional CPU overhead is hardly caused. Moreover, a front-end drive (that is, the FE) of the virtual device is in the VM, so the FE transfers data through a back-end drive (that is, the BE) in the Host, and the VM does not perceive a real physical device of the Host, which is convenient for transition and implementation of device sharing, thereby implementing the optimization of compatibility of a virtualization system.

In addition, during the procedure of executing the DMA read request, the hardware module IOMMU implements the translation between the GPA and the HPA, thereby reducing CPU overhead and further improving performance.

Referring to FIG. 9-a, another virtualization processing method provided in an embodiment of the present invention may include:

901. Install drivers of a PF device and a VF device in the Host, where the PF device and the VF device are corresponding to an I/O device (referred to as E-4).

902. Enable, by the Host, the I/O virtual function of the I/O device E-4;

where, for example, the Host may enable the I/O virtual function of the I/O device E-4 when being initiated or at a certain moment after being initiated. The corresponding physical function PF device and several virtual function VF devices can be virtualized from the I/O device E-4 with the I/O virtual function enabled, definitely, another module may be used to enable the I/O device E-4, and definitely, the I/O device E-4 may also automatically enable its I/O virtual function when the device is powered on, and in this case, it is unnecessary for the Host or another module to enable the I/O virtual function of the I/O device E-4. The PF device virtualized from the I/O device E-4 is mainly responsible for a management function, and the VF device is mainly responsible for a processing function.

903. Generate a PF software instance and several VF software instances in the Host; where the corresponding PF device and several VF devices can be virtualized from the I/O device E-4 with the I/O virtual function enabled; the several VF software instances and the several VF devices are in one-to-one correspondence, and the PF software instance generated in the Host is corresponding to the PF device virtualized from the I/O device E-4.

904. Create, by the Host, an I/O virtual device (for example, referred to as vE-4) having the same type with the I/O device E-4;

where, a back-end instance BE (for example, referred to as BE-4) of the I/O virtual device vE-4 is created in the Host, and a front-end instance FE (for example, referred to as FE-4) of the I/O virtual device vE-4 is created in the initiated VM (for example, referred to as VM-4). For example, the Host may trigger the creation of the front-end instance FE-4 corresponding to the I/O virtual device vE-4 in the initiated VM-4. It may be considered that, the FE-4 created in the VM-4 and the BE-4 created in the Host commonly construct a driver of the I/O virtual device vE-4.

905. Bind, by the Host, the created BE-4 with one idle VF software instance (for example, referred to as Vfe-4);

where, the VF software instance Vfe-4, for example, is corresponding to the VF device (for example, referred to as VF-4) virtualized from the I/O device E-4. The so-called idle VF software instance is a VF software instance that is not bound with another back-end instance BE.

So far, a channel between the VF device VF-4 virtualized from the I/O device E-4 and the front-end instance FE-4 in the VM-4 is got through, in this way, the FE-4 can access the VF device VF-4 through the BE-4 in the Host. The VF device VF-4 is separately allocated to the VM-4 for use, the VF device VF-4 is virtualized from the I/O device E-4 and can provide a high-efficient device interface, so it is beneficial for the VM-4 to acquire the performance similar to that of a physical machine, the delay is low and any additional CPU overhead is hardly caused. Moreover, a front-end drive (that is, the FE-4) of the virtual device is in the VM-4, so the data is transferred through a back-end drive (that is, the BE-4) in the Host, and the VM-4 does not perceive a real physical device of the Host, which is convenient for transition and implementation of device sharing.

906. Write, by the FE-4, a GPA corresponding to the cache where data to be sent locates into a shared memory between the Host and the VM-4, and notify the BE-4 (definitely, it is also possible that after performing self detection, the BE-4 finds that the GPA corresponding to the cache where data to be sent locates is written into the shared memory).

907. Modify, by the Host, the GPA corresponding to the cache where data to be sent locates in the shared memory into a corresponding HPA;

where, for example, an address translation page table is set in the Host, the address translation page table records mapping between the GPA and the HPA (for example, as shown in FIG. 9-b). By looking up the address translation page table, the Host may, for example, acquire an HPA corresponding to the GPA that is corresponding to the cache where data to be sent locates, and modify the GPA corresponding to the cache where data to be sent locates to the acquired HPA.

908. Invoke, by the BE-4, a program sending interface of the VF software instance Vfe-4 bound with the BE-4, and write the HPA corresponding to the cache where data to be sent locates into a sending queue of the VF device VF-4 corresponding to the VF software instance Vfe-4.

909. When finding that there is data to be sent, initiate, by the VF device VF-4, a DMA read request by using the HPA recorded in the sending queue of the the VF device as a target address;

where, the VF device VF-4 may, for example, detect the sending queue of the the VF device periodically or non-periodically, and when finding that an HPA is newly written into the sending queue, consider that there is data to be sent, or, the VF software instance Vfe-4 may notify the VF device VF-4 after an HPA is newly written into the sending queue.

910. Notify, by the VF device VF-4, the corresponding VF software instance Vfe-4 in the Host after the DMA read request is executed, so that the VF software instance Vfe-4 triggers the front-end instance FE-4 in the VM-4 to release the cache corresponding to the HPA.

When being triggered by the VF software instance Vfe-4, the front-end instance FE-4 in the VM-4 may release the cache corresponding to the HPA, so as to cache new data.

It can be seen that, in this embodiment, after the I/O virtual function of the I/O device enabled by the Host is enabled, several VF software instances are generated in the Host; several corresponding VF devices are virtualized from the I/O device with the I/O virtual function enabled; the several VF software instances and the several VF devices are in one-to-one correspondence; the Host creates an I/O virtual device having the same type with the I/O device, where a back-end instance BE of the I/O virtual device is created in the Host, and a front-end instance FE of the I/O virtual device is created in the initiated VM; the BE is bound with the idle VF software instance, in this way, the application architecture in which each VM can independently use one VF device is established, a channel between one VF device virtualized from the I/O device and the front-end instance FE in one VM is got through, so that the FE can access the VF device through the BE in the Host. The VF device virtualized from the I/O device is separately allocated to the VM for use, and the VF device can provide a high-efficient device interface, so it is beneficial for the VM to acquire the performance similar to that of a physical machine, the delay is low and any additional CPU overhead is hardly caused. Moreover, a front-end drive (that is, the FE) of the virtual device is in the VM, so the data is transferred through a back-end drive (that is, the BE) in the Host, and the VM does not perceive a real physical device of the Host, which is convenient for transition and implementation of device sharing, thereby implementing the optimization of compatibility of a virtualization system.

In addition, during the procedure of executing the DMA read request, the Host implements the translation between the GPA and the HPA, thereby reducing hardware resource configuration, and simplifying the processing flow.

For better understanding and implementation of the foregoing methods in the embodiments of the present invention, apparatuses and a computer system configured to implement the foregoing methods are further provided.

Referring to FIG. 10, a host 1000 provided in an embodiment of the present invention may include:

a first creating module 1010, a second creating module 1020 and a binding module 1030;

the first creating module 1010 is configured to, after an I/O virtual function of an input/output I/O device is enabled, generate several VF software instances in the Host 1000, where several corresponding virtual function VF devices are virtualized from the I/O device with the I/O virtual function enabled, and the several VF software instances generated in the Host 1000 and the several VF devices are in one-to-one correspondence;

the second creating module 1020 is configured to create an I/O virtual device having the same type with the I/O device, where, a back-end instance BE of the I/O virtual device is created in the Host 1000, a front-end instance FE of the I/O virtual device is created in an initiated virtual machine VM; and the binding module 1030 is configured to bind the BE created by the second creating module 1020 with an idle VF software instance created by the first creating module 1010.

It can be understood that, the host 1000 in this embodiment may be the Host in each of the foregoing method embodiments, functions of each function module may be specifically implemented according to the method in each of the foregoing method embodiments. For the specific implementation procedure, reference can be made to relevant description of the foregoing method embodiments, and details are not repeated herein.

It can be seen that, in this embodiment, after the I/O virtual function of the I/O device is enabled, several VF software instances are generated in the Host 1000; several corresponding VF devices are virtualized from the I/O device with the I/O virtual function enabled; the several VF software instances generated in the Host 1000 and the several VF devices are in one-to-one correspondence; the Host creates an I/O virtual device having the same type with the I/O device, where a back-end instance BE of the I/O virtual device is created in the Host 1000, and a front-end instance FE of the I/O virtual device is created in the initiated VM; the BE is bound with the idle VF software instance, in this way, the application architecture in which each VM can independently use one VF device is established, a channel between one VF device virtualized from the I/O device and the front-end instance FE in one VM is got through, so that the FE can access the VF device through the BE in the Host. The VF device virtualized from the I/O device is separately allocated to the VM for use, and the VF device can provide a high-efficient device interface, so it is beneficial for the VM to acquire the performance similar to that of a physical machine, the delay is low and any additional CPU overhead is hardly caused. Moreover, a front-end drive (that is, the FE) of the virtual device is in the VM, so data is transferred through a back-end drive (that is, the BE) in the Host 1000, and the VM does not perceive a real physical device of the Host 1000, which is convenient for transition and implementation of device sharing, thereby implementing the optimization of compatibility of a virtualization system.

Referring to FIG. 11-a, a computing node 1100 provided in an embodiment of the present invention may include, a hardware layer 1110, a Host 1120 running on the hardware layer 1110, and at least one virtual machine VM 1130 running on the Host 1120.

The hardware layer 1110 includes an I/O device 1111, several corresponding virtual function VF devices 11111 are virtualized from the I/O device 1111, the Host 1120 has several VF software instances 1121, the several VF software instances 1121 and the several VF devices 11111 are in one-to-one correspondence; the Host 1120 further has a back-end instance BE 1122 of an I/O virtual device having the same type with the I/O device 1111, the VM 1130 has a front-end instance FE 1131 of the I/O virtual device; the BE 1122 in the Host 1120 is bound with an idle VF software instance 1121.

In an application scenario, the FE 1131 is configured to pre-allocate a cache for direct memory access DMA.

The VF software instance 1121 bound with the BE 1122 is configured to acquire an address corresponding to the cache for DMA through an exporting application programming interface of the BE 1122, and write the acquired address corresponding to the cache for DMA into a first storage unit of the VF device 11111 corresponding to the VF software instance 1121.

The VF device 11111 is configured to select the address corresponding to the cache for DMA from the first storage unit when there is data to be received, and initiate a DMA write request by using the address corresponding to the cache for DMA as a target address; notify the corresponding VF software instance 1121 in the Host 1120 after the DMA write request is executed, so that the VF software instance 1121 triggers the FE 1131 to receive data written into the cache corresponding to the address.

Referring to FIG. 11-b, in an application scenario, the FE 1131 is further configured to write a guest physical address GPA corresponding to the pre-allocated cache for DMA into a shared memory 1140 between the Host 1120 and the VM 1130.

The VF software instance 1121 bound with the BE 1122 may be specifically configured to acquire the GPA corresponding to the cache for DMA from the shared memory 1140 through the exporting application programming interface of the BE 1122, and write the acquired GPA corresponding to the cache for DMA into the first storage unit of the VF device 11111 corresponding to the VF software instance 1121.

Moreover, the FE 1131 may also notify the GPA corresponding to the pre-allocated cache for DMA to the corresponding BE 1122; and the VF software instance 1121 bound with the BE 1122 may acquire the GPA corresponding to the cache for DMA through the exporting application programming interface of the BE 1122.

The VF device 11111 may be specifically configured to, select a GPA corresponding to the cache for DMA from the first storage unit when there is data to be received, initiate a DMA write request by using the selected GPA corresponding to the cache for DMA as a target address; notify the corresponding VF software instance 1121 in the Host 1120 after the DMA write request whose target address GPA is modified to a corresponding HPA is executed, so that the VF software instance 1121 triggers the FE 1131 to receive data written into the cache corresponding to the HPA.

The hardware layer 1110 of the computing node 1100 may further include:

an input/output memory management unit IOMMU 1112, configured to modify the target address GPA of the DMA write request initiated by the VF device 11111 to a corresponding Host physical address HPA.

For example, an address translation page table is set in the IOMMU 1112, where the address translation page table records mapping between the GPA and the HPA; the IOMMU 1112 may acquire an HPA corresponding to the target address GPA of the DMA write request by looking up the address translation page table, and modify the target address GPA of the DMA write request to the acquired HPA.

Referring to FIG. 11-c, in another application scenario, the FE 1131 may further be configured to, write the GPA corresponding to the pre-allocated cache for DMA into the shared memory 1140 between the Host 1120 and the VM 1130.

The Host 1120 may be configured to modify the GPA corresponding to the cache for DMA in the shared memory 1140 to a corresponding HPA.

For example, an address translation page table is set in the Host 1120, where the address translation page table records mapping between the GPA and the HPA; by looking up the address translation page table, the Host 1120 may acquire an HPA corresponding to the GPA that is corresponding to the cache for DMA in the shared memory, and modify the GPA corresponding to the cache for DMA in the shared memory to the acquired HPA. Definitely, the FE 1131 may also notify the GPA corresponding to the pre-allocated cache for DMA to the corresponding BE 1122, and the Host 1120 may modify the GPA corresponding to the cache for DMA to the corresponding HPA.

The VF software instance 1121 bound with the BE 1122 may be specifically configured to acquire the HPA corresponding to the cache for DMA through the exporting application programming interface of the BE 1122; and write the acquired HPA corresponding to the cache for DMA into a first storage unit of the VF device 11111 corresponding to the VF software instance 1121.

The VF device 11111 may be specifically configured to select the HPA corresponding to the cache for DMA from the first storage unit when there is data to be received, initiate a DMA write request by using the selected HPA as a target address, and notify the corresponding VF software instance 1121 in the Host 1120 after the DMA write request is executed, so that the VF software instance 1121 triggers the FE 1131 to receive data written into the cache corresponding to the HPA.

Further, in an application scenario, the FE 1131 is further configured to write the GPA corresponding to the cache where data to be sent locates into the shared memory 1140 between the Host 1120 and the VM 1130.

The BE 1122 may further be configured to acquire the GPA corresponding to the cache where data to be sent locates from the shared memory 1140; invoke a program sending interface of the VF software instance 1121 bound with the BE 1122, and write the GPA corresponding to the cache where data to be sent locates into a second storage unit of the VF device 11111 corresponding to the VF software instance 1121.

Moreover, the FE 1131 may also notify the GPA corresponding to the cache where data to be sent locates to the corresponding BE 1122, and the BE 1122 acquires, according to the notification, the GPA corresponding to the cache where data to be sent locates.

The VF device 11111 is further configured to initiate a DMA read request by using the GPA recorded in the second storage unit as a target address, when finding that there is data to be sent; moreover, the VF device 11111 may further be configured to, after the DMA read request is executed, notify the corresponding VF software instance 1121 in the Host 1120, so that the VF software instance 1121 triggers the FE 1131 to release the corresponding cache.

The hardware layer 1110 of the computing node 1100 may further include:

an input/output memory management unit IOMMU 1112, configured to modify the target address GPA of the DMA read request initiated by the VF device 11111 to a corresponding HPA.

For example, an address translation page table is set in the IOMMU 1112, where the address translation page table records mapping between the GPA and the HPA; the IOMMU 1112 may acquire an HPA corresponding to the target address GPA of the DMA read request by looking up the address translation page table, and modify the target address GPA of the DMA read request to the acquired HPA.

In another application scenario, the FE 1131 may further be configured to write the GPA corresponding to the cache where data to be sent locates into the shared memory 1140 between the Host 1120 and the VM 1130.

The Host 1120 may be configured to modify the GPA corresponding to the cache where data to be sent locates in the shared memory 1140 to a corresponding HPA.

For example, an address translation page table is set in the Host 1120, where the address translation page table records mapping between the GPA and the HPA; by looking up the address translation page table, the Host 1120 may acquire an HPA corresponding to the GPA that is corresponding to the cache where data to be sent locates in the shared memory, and modify the GPA corresponding to the cache where data to be sent locates in the shared memory into the corresponding HPA. Definitely, the FE 1131 may also notify the GPA corresponding to the cache where data to be sent locates to the Host 1120, and the Host 1120 may modify the GPA corresponding to the cache where data to be sent locates to the corresponding HPA.

The BE 1122 is further configured to acquire the HPA corresponding to the cache where data to be sent locates; invoke a program sending interface of the VF software instance 1121 bound with the BE 1122, and write the HPA corresponding to the cache where data to be sent locates into a second storage unit of the VF device 11111 corresponding to the VF software instance 1121.

The VF device 11111 may further be configured to initiate a DMA read request by using the HPA recorded in the second storage unit as a target address, when finding that there is data to be sent. In addition, the VF device 11111 may further be configured to, after the DMA read request is executed, notify the corresponding VF software instance 1121 in the Host 1120, so that the VF software instance 1121 triggers the FE 1131 to release the corresponding cache.

The first storage unit, for example, is a receiving queue or receiving list of the VF device or another data storage structure capable of recording an address. The second storage unit, for example, is a sending queue or sending list of the VF device or another data storage structure capable of recording an address.

It can be understood that, the Host 1120 in this embodiment can be the Host in each of the foregoing method embodiments, the working mechanism of a virtualization system on which the computing node 1100 runs in the embodiment may be as that described in the foregoing method embodiments, functions of each function module may be specifically implemented according to the method in each of the foregoing method embodiments. For the specific implementation procedure, reference can be made to relevant description of the foregoing method embodiments, and details are not repeated herein.

It can be seen that, the computing node 1100 in the embodiment of the present invention includes: a hardware layer, a Host running on the hardware layer, and at least one VM running on the Host, where the hardware layer includes an input/output I/O device, several corresponding virtual function VF devices are virtualized from the I/O device; the Host has several VF software instances, and the several VF software instances and the several VF devices are in one-to-one correspondence; the Host further has a back-end instance BE of an I/O virtual device having the same type with the I/O device, and the VM has a front-end instance FE of the I/O virtual device, where the BE in the Host is bound with an idle VF software instance. In this way, application architecture in which each VM can independently use one VF device is established, a channel between one VF device virtualized from the I/O device and the front-end instance FE in one VM is got through, so that the FE can access the VF device through the BE in the Host. The VF device virtualized from the I/O device is separately allocated to the VM for use, and the VF device can provide a high-efficiency device interface, so it is beneficial for the VM to acquire the performance similar to that of a physical machine, the delay is low, and any extra CPU overhead is hardly caused. Moreover, a front-end drive (that is, the FE) of the I/O virtual device is in the VM, so the FE transfers data through a back-end drive (that is, the BE) in the Host, and the VM does not perceive a real physical device of the Host, which is convenient for transition and implementation of device sharing, thereby implementing the optimization of compatibility of a virtualization system.

Referring to FIG. 12, an embodiment of the present invention further provides a computer system, which may include:

at least one computing node 1100.

It should be noted that, as for each of the foregoing method embodiments, for simple description, the method is described as a series of action combination, but persons of ordinary skill in the art should learn that, the present invention is not limited by the described action sequence, because according to the present invention, some steps may be performed in other sequences or performed simultaneously. Furthermore, persons skilled in the art should learn that all the embodiments described in the specification are exemplary embodiments, and the operations and modules involved may not be necessary for the present invention.

In the above embodiments, the description of each embodiment has its emphasis, and for the part that is not detailed in an embodiment, reference may be made to the relevant description of other embodiments.

In view of the above, the computing node in the embodiment of the present invention may include: a hardware layer, a Host running on the hardware layer, and at least one VM running on the Host, the hardware layer includes an input/output I/O device, several corresponding virtual function VF devices are virtualized from the I/O device; the Host has several VF software instances, and the several VF software instances and the several VF devices are in one-to-one correspondence; the Host further has a back-end instance BE of an I/O virtual device having the same type with the I/O device, and the VM has a front-end instance FE of the I/O virtual device, where the BE in the Host is bound with an idle VF software instance. In this way, application architecture in which each VM can independently use one VF device is established, a channel between one VF device virtualized from the I/O device and the front-end instance FE in one VM is got through, so that the FE can access the VF device through the BE in the Host. The VF device virtualized from the I/O device is separately allocated to the VM for use, and the VF device can provide a high-efficiency device interface, so it is beneficial for the VM to acquire the performance similar to that of a physical machine, the delay is low, and any extra CPU overhead is hardly caused. Moreover, a front-end drive (that is, the FE) of the I/O virtual device is in the VM, so the FE transfers data through a back-end drive (that is, the BE) in the Host, and the VM does not perceive a real physical device of the Host, which is convenient for transition and implementation of device sharing, thereby implementing the optimization of compatibility of a virtualization system. Moreover, it is unnecessary that the OS in the VM has the latest hardware technology support, the computing node is applicable to various mainstream OSs, without depending on VM drives provided by hardware providers (IHV); the isolation and decoupling between a virtual machine and a physical platform are saved completely, and the virtual machine is easy to be transited; the Host can still monitor data receiving and sending in the VM, and advanced features, such as data filtering and memory multiplexing, can still be used; the FE part of front-end of the PV can be multiplexed, and upgrading is performed conveniently.

Moreover, during the procedure of executing the DMA read/write request, the hardware module IOMMU implements the translation between the GPA and the HPA, thereby reducing hardware resource configuration, and simplifying the processing flow. Alternatively, during the procedure of executing the DMA read request, the Host implements the translation between the GPA and the HPA, thereby reducing hardware resource configuration, and simplifying the processing flow.

Persons of ordinary skill in the art should understand that all or a part of the steps of the method according to the embodiments of the present invention may be implemented by a program instructing relevant hardware. The program may be stored in a computer readable storage medium, such as a read only memory, a random access memory, a magnetic disk or an optical disk.

The virtualization processing method and apparatuses, and a computer system provided in embodiments of the present invention are described in detail. The principle and implementation of the present invention are described herein through specific examples. The description about the embodiments of the present invention is merely provided for easy understanding of the method and core ideas of the present invention. Persons of ordinary skill in the art can make variations and modifications to the present invention in terms of the specific implementation and application scopes according to the ideas of the present invention. Therefore, the specification shall not be construed as a limit to the present invention.

What is claimed is:

1. A computing node, comprising:
    a hardware layer, a Host layer, and at least one virtual machine (VM) running on the Host layer, wherein the hardware layer comprises an input/output (I/O) device, wherein a plurality of corresponding virtual function (VF) devices are virtualized from the I/O device, wherein the Host has a plurality of VF software instances the plurality of VF software instances being in one-to-one correspondence with the plurality of VF devices wherein the Host layer further has a back-end instance (BE) of an I/O virtual device having a same type with the I/O device, wherein the VM has a front-end instance (FE) of the I/O virtual device, and wherein the BE in the Host layer is bound on a one-to-one basis with an idle VF software instance;
    wherein the VF software instance bound with the BE is configured to: acquire an address corresponding to a cache for direct memory access (DMA) through an exporting application programming interface (API) of the BE; and
    write the acquired address corresponding to the cache for DMA into a first storage unit in a VF device corresponding to the VF software instance; and wherein the VF software instance bound with the BE is further configured to:
    select the address corresponding to the cache for DMA from the first storage unit when there is data to be received; and
    initiate a DMA write request by using the selected address corresponding to the cache for DMA as a target address.

2. The computing node of claim 1, wherein the Host layer includes a virtual machine monitor (VMM) running on the hardware layer.

3. The computing node of claim 1, wherein the FE is configured to pre-allocate the cache for direct memory access (DMA).

4. The computing node of claim 1, wherein the VF software instance bound with the BE is further configured to notify the VF software instance that corresponds to the VF device and is in the Host layer after the DMA write request is executed, so that the VF software instance triggers the FE to receive data written into the cache corresponding to the address.

5. A virtualization processing method, applied in a computing node, wherein the computing node comprises:
a hardware layer having an input/output (I/O) device, and a Host layer, the method comprising:
generating after an input/output (I/O) virtual function (VF) of the I/O device is enabled, a plurality of VF software instances in the Host layer, wherein a plurality of corresponding VF devices are virtualized from the I/O device with the I/O VF enabled, and the plurality of VF software instances are in one-to-one correspondence with the plurality of VF devices;
creating, in the Host layer, an I/O virtual device having a same type as the I/O device creating a back-end instance (BE) of the I/O virtual device in the Host layer, and a front-end instance (FE) of the I/O virtual device in an initiated virtual machine (VM) running on the Host layer;
binding the BE on a one-to-one basis with an idle VF software instance; acquiring, by the VF software instance bound with the BE an address corresponding to a cache for direct memory access (DMA) through an exporting application programming interface of the BE;
writing the acquired address corresponding to the cache for DMA into a first storage unit of a VF device corresponding to the VF software instance;
selecting, by the VF device, an address corresponding to the cache for DMA from the first storage unit when there is data to be received; and initiating a DMA write request by using the selected address corresponding to the cache for DMA as a target address.

6. The method of claim 5, wherein the Host layer includes a virtual machine monitor (VMM) running on the hardware layer.

7. The method of claim 5, further including pre-allocating, by the FE, the cache for direct memory access (DMA).

8. The method of claim 5, further including notifying, by the VF device, the VF software instance that corresponds to the VF device and is in the Host layer after the DMA write request is executed, so that the VF software instance triggers the FE to receive data written into the cache corresponding to the address.

9. A host, running on a hardware layer, wherein the hardware layer comprises an input/output (I/O) device, the host comprising:

a first creating module, configured to after an I/O virtual function of the input/output I/O device is enabled generate a plurality of VF software instances; wherein a plurality of corresponding virtual function VF devices are virtualized from the I/O device with the I/O virtual function enabled; wherein each of the plurality of generated VF software instances corresponds to a different VF device of the plurality of VF devices;
a second creating module, configured to:
create an I/O virtual device having a same type as the I/O device,
create a back-end instance BE of the I/O virtual device, and
create a front-end instance FE of the I/O virtual device in an initiated virtual machine VM running on the host; and
a binding module, configured to bind the BE created by the second creating module on a one-to-one basis with an idle VF software instance created by the first creating module;
wherein the binding module performing the bind of the BE created by the second creating module on a one-to-one basis with an idle VF software instance created by the first creating module is configured to:
acquire an address corresponding to a cache for DMA through an exporting application programming interface (API) of the BE; and
write the acquired address corresponding to the cache for direct memory access (DMA) DMA into a first storage unit in a VF device corresponding to the VF software instance; and
wherein the binding module performing the bind of the BE created by the second creating module on a one-to-one basis with an idle VF software instance created by the first creating module is further configured to:
select the address corresponding to the cache for DMA from the first storage unit when there is data to be received; and
initiate a DMA write request by using the selected address corresponding to the cache for DMA as a target address.

10. The host of claim 9, wherein the Host is a virtual machine monitor (VMM) running on the hardware layer.

11. The host of claim 9, wherein the FE is configured to pre-allocate the cache for direct memory access (DMA).

12. The host of claim 9, wherein bind the BE created by the second creating module on a one-to-one basis with an idle VF software instance created by the first creating module is further configured to notify the VF software instance that corresponds to the VF device and is in the Host layer after the DMA write request is executed, so that the VF software instance triggers the FE to receive data written into the cache corresponding to the address.

* * * * *